United States Patent
Jung

(10) Patent No.: US 12,329,342 B2
(45) Date of Patent: Jun. 17, 2025

(54) DISHWASHER

(71) Applicant: LG ELECTRONICS INC., Seoul (KR)

(72) Inventor: Sang-ick Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/517,842

(22) Filed: Nov. 22, 2023

(65) Prior Publication Data

US 2024/0172916 A1     May 30, 2024

(30) Foreign Application Priority Data

Nov. 24, 2022 (KR) ........................ 10-2022-0158926

(51) Int. Cl.
*G03B 21/00* (2006.01)
*A47L 15/42* (2006.01)
*G03B 21/28* (2006.01)

(52) U.S. Cl.
CPC ........ *A47L 15/4293* (2013.01); *G03B 21/006* (2013.01); *G03B 21/28* (2013.01)

(58) Field of Classification Search
CPC .... A47L 15/4293; G03B 21/006; G03B 21/28
See application file for complete search history.

(56) References Cited

U.S. PATENT DOCUMENTS

| | | | |
|---|---|---|---|
| 8,870,392 B2 | 10/2014 | Kleinert et al. | |
| 2008/0178916 A1 | 7/2008 | Kedjierski | |
| 2012/0320345 A1* | 12/2012 | Kleinert | D06F 34/32 |
| | | | 353/101 |
| 2021/0038051 A1 | 2/2021 | Ozertug et al. | |

FOREIGN PATENT DOCUMENTS

| | | |
|---|---|---|
| DE | 10 2011 081 334 A1 | 11/2012 |
| DE | 10 2018 213 979 A1 | 2/2020 |
| EP | 3772316 A1 | 2/2021 |
| EP | 4 091 523 A1 | 11/2022 |
| KR | 10-2016-0078195 A | 7/2016 |
| KR | 10-2020-0011505 A | 2/2020 |
| KR | 10-2021-0093775 A | 7/2021 |

OTHER PUBLICATIONS 102018213979 machine translation (Year: 2018).*

* cited by examiner

*Primary Examiner* — James A Dudek
(74) *Attorney, Agent, or Firm* — Birch, Stewart, Kolasch & Birch, LLP

(57) ABSTRACT

A dishwasher includes an indicator configured to display a visual image by projecting a light beam to an external floor, wherein the indicator including a holder including an accommodating space, a light source module positioned in the accommodating space, the light source module being configured to generate the light beam, a first lens configured to refract the light beam generated in the light source module, an LCD module configured to generate the visual image by partially blocking the light beam having passed through the first lens, a reflector configured to change a traveling path of the visible light beam having passed through the LCD module toward the external floor, and a second lens configured to refract the visible light beam of which the traveling path is changed, wherein a stopper rib is provided on an inner surface of the holder, and wherein the reflector is supported by the stopper rib.

17 Claims, 29 Drawing Sheets

(a)

(b)

(c)

DISHWASHER

CROSS-REFERENCE TO RELATED APPLICATION

This application claims priority to and the benefit of Korean Patent Application No. 10-2022-0158926, filed on Nov. 24, 2022, the disclosure of which is incorporated herein by reference in its entirety.

BACKGROUND OF THE INVENTION

1. Field of the Invention

The present disclosure relates to a dishwasher, more particularly, a dishwasher that may significantly reduce manufacturing costs by simplifying and communizing the arrangement of and fixing structure of individual function modules of an indicator projecting status information of the dishwasher as an image on an external floor.

2. Description of the Related Art

A dishwasher is an electric home appliance that sprays wash water such as water to wash dishes and cooking utensils stored inside. At this time, the wash water used in washing dishes may include a washing detergent.

The dishwasher includes a tub that defines a washing space; a storage portion that accommodates washing targets; a spray arm that sprays wash water; and a sump that stores water and supplies to wash water to the spray arm.

By using such the dishwasher, the time and effort required to wash dishes such as dishes after a meal may be reduced, thereby contributing to user convenience.

Recently, for the purpose of expanding kitchen space, the proportion of built-in dishwashers is gradually increasing.

In particular, products with a cover panel attached to a front surface of a door are appearing one after another to create a sense of unity with the space where the dishwasher is placed and the surrounding furniture.

In order to create the sense of unity with surrounding furniture, the cover panel may be manufactured to have the same texture and color as the exterior of the surrounding furniture.

However, when the dishwasher is placed as built-in type attached to the door, the cover panel completely covers the door.

Accordingly, users have difficulty intuitively determining whether the dishwasher is operating or not.

In this regard, European Patent Publication No. 3772316 (Cited document 001) discloses a dishwasher including a display device configured to project status information of the dishwasher through a beam projector on the external floor surface on which the dishwasher is supported.

The dishwasher of Cited document 001 may be configured to project a beam to the external floor surface through a space formed in a lower area of a door.

For this purpose, the display device may be configured to be attached to the bottom of a lower frame disposed between a base supported by the external floor and a tub.

However, since the display device of Cited document 001 is attached to the lower surface of a lower frame disposed on a lower area of the tub, the display device could belong to a range of rotation in a lower end of the door when the door is operated to be open.

Accordingly, there is a high possibility that interference occur between the display device and the door when the door is rotated to open, and there is a very high possibility that physical damage or damage to the display device would occur when the door is rotated.

In addition, since the display device of Cited document 001 is attached to the lower surface of the lower frame disposed in the lower area of the tub, there is a high possibility that leaked wash water travels along the lower frame and flows into the interior of the display device, if wash water leaks through the door, and there is a high possibility of damage to the electrical components provided inside the display device accordingly.

Meanwhile, in response to this, U.S. Pat. Publication No. 8870392 (Cited document 002) discloses a dishwasher including a configuration in that a display device is attached and fixed to an upper surface of a lower frame.

However, the display device of Cited document 002 only roughly discloses the display device and unclearly discloses a configuration of fixing individual modules to an outer casing.

In addition, it unclearly discloses an electrical connection relationship between an internal light source and a circuit board for controlling the display device and an electrical connection relationship for a main controller.

Accordingly, the display device of Cited document 002 has a problem in that it is virtually impossible to realize the configuration into an actual product.

In addition, the display device of Cited document 002 is configured to include an outer casing in which a separate inner casing is provided to accommodate and support a light source module, a first lens and a display module.

Due to this structure, there would be a problem where the quantity of components to construct the display device increases excessively. As the size of the display device itself increases, a problem may arise in that the display device might be unsuitable for placement in a narrow space formed between the lower frame and the tub.

Prior Art Cited documents (Cited document 1) European Patent Publication No. 3772316. (Cited document 002) U.S. Pat. Publication No. 8,870,392

SUMMARY OF THE DISCLOSURE

To overcome the above-noted disadvantages of the prior art, one objective of the present disclosure is to provide a dishwasher that may significantly reduce manufacturing costs by simplifying and communizing the arrangement and fixing configuration of individual function modules of an indicator projecting status information of the dishwasher as an image on an external floor.

Another objective of the present disclosure is to provide a dishwasher that may effectively prevent damage caused by interference with a door and rotation of the door when the door is opened by placing an indicator on an upper surface of a lower frame.

A further objective of the present disclosure is to provide a dishwasher that has excellent spatial utilization by minimizing components to support individual function modules constituting the indicator and minimizing the size of the indicator.

A still further objective of the present disclosure is to provide a dishwasher that may reduce manufacturing costs and simplify the structure by simplifying and communizing a harness module for electrical connection between electrical components and electrically connecting those electrical components with a main controller, among individual function modules constituting an indicator.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

To overcome the above-noted disadvantages, a dishwasher according to an embodiment may include an indicator configured to display a predetermined information into a visual image by projecting a visible light beam to an external floor, wherein the indicator includes, a holder in which an accommodating space is formed; a light source module accommodated in the accommodating space and configured to generate the visible light beam; a first lens configured to refract the visible light beam generated in the light source module; an LCD module configured to generate the visual image by partially blocking the visible light beam having passed through the first lens; a reflector configured to change a traveling path of the visible light beam having passed through the LCD module toward the external floor; and a second lens configured to refract the visible light beam of which the traveling path is changed, wherein a stopper rib may be provided on an inner surface of the holder, and wherein the reflector is supported by the stopper rib.

An one side of the reflector may be supported by the stopper rib.

The stopper rib may extend along a vertical direction in a bar-shape, and an upper portion of the reflector may be supported by an upper end of the stopper rib.

An other side of the reflector may be supported by second lens.

A locking groove formed concave downward may be provided on an one surface of the second lens, and the other side of the reflector may be supported by the locking groove.

The reflector may be supported by the stopper rib in a state of being inclined with respect to the second lens, and an inclined surface having an inclination angle corresponding to an inclination gradient of the reflector may be provided at the stopper rib, and the reflector may be in contact with the inclined surface.

An lower end of the stopper rib may be integrally connected to an lower surface of the holder.

A dishwasher according to another embodiment may include an indicator configured to display a predetermined information into a visual image by projecting a visible light beam to an external floor, wherein the indicator includes, a holder in which an accommodating space is formed; a light source module accommodated in the accommodating space and configured to generate the visible light beam; and a lens configured to refract the visible light beam generated in the light source module, wherein the visible light beam refracted while passing through the lens may be projected toward the external floor after passing through a light transmission hole formed in the holder, and wherein the lens may include a refracting portion having a convex lens shape; and an expanding portion forming an outer circumferential surface of the retracting portion.

The refracting portion may be convex toward the external floor.

The refracting portion may be disposed on the holder to be at least partially inserted in the light transmission hole.

The refracting portion may be disposed on the holder so as not to protrude beyond the light transmission hole.

A protrusion protruding upward may be integrally formed on an upper surface of the expanding portion.

A dishwasher according to still another embodiment may include an indicator configured to display a predetermined information into a visual image by projecting a visible light beam to an external floor, wherein the indicator includes, a holder in which an accommodating space is formed; a light source module accommodated in the accommodating space and configured to generate the visible light beam; a lens configured to refract the visible light beam generated in the light source module, wherein the visible light beam refracted while passing through the lens may be projected toward the external floor after passing through a light transmission hole formed in the holder, and wherein at least one of a protrusion, a locking groove and a notch slot may be provided on the lens to be coupled to the holder.

The indicator may further include a cover coupled to the holder and sealing the accommodating space, and the at least one of the protrusion, the locking groove and the notch slot may be in contact with the holder.

The indicator may further include a reflector configured to change a traveling path of the visible light beam toward the external floor, and a support rib preventing a movement of the reflector may be provided on a lower surface of the cover.

An one side of the reflector may be supported by the stopper rib, and an other side of the reflector may be supported by the at least one of the protrusion, the locking groove and the notch slot.

A dishwasher according to still another embodiment may include an indicator configured to display a predetermined information into a visual image by projecting a visible light beam to an external floor, wherein the indicator includes, a holder in which an accommodating space is formed; a light source module accommodated in the accommodating space and configured to generate the visible light beam; a optical module configured to change a traveling path of the visible light beam or to refract the visible light beam; and a cover coupled to the holder, wherein a rib preventing a separation of the optical module may be provided on the holder or the cover.

The rib may include a stopper rib provided on an inner surface of the holder, and guiding a installation position of the optical module; and a support rib provided on the cover, and preventing a movement of the optical module, and wherein the separation of the optical module may be prevented by the stopper rib and the support rib.

The optical module may include a lens configured to refract the visible light beam, and the lens may be in contact with the stopper rib.

The optical module may include a reflector configured to change a traveling path of the visible light beam toward the external floor, and the reflector may be in contact with the support rib.

The dishwasher according to the present disclosure may effectively prevent interference with the door when the door is open and damage due to the rotation of the door.

In addition, the dishwasher according to the present disclosure may simplify and communize the arrangement and fixing structure for separate functional modules that constitute the indicator, thereby remarkably reducing manufacturing costs.

In addition, the dishwasher may include the misassembling preventing means for separate functional modules inside the holder supporting the functional modules that constitute the indicator, thereby effectively preventing the misassembling of the functional modules.

In addition, the dishwasher according to the present disclosure may minimize the components for supporting the separate functional modules and minimizing the size of the indicator, thereby making space utilization excellent.

In addition, the dishwasher according to the present disclosure may simplify and communize the configuration of the harness module for electrically connecting electric components among the separate functional modules constituting the indicator and electrically connecting the electrical components with the main controller, thereby reducing the manufacturing costs and simplifying the structure. Specific effects are described along with the above-described effects in the section of Detailed Description.

Further scope of applicability of the invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE EMBODIMENTS

Figure 1:
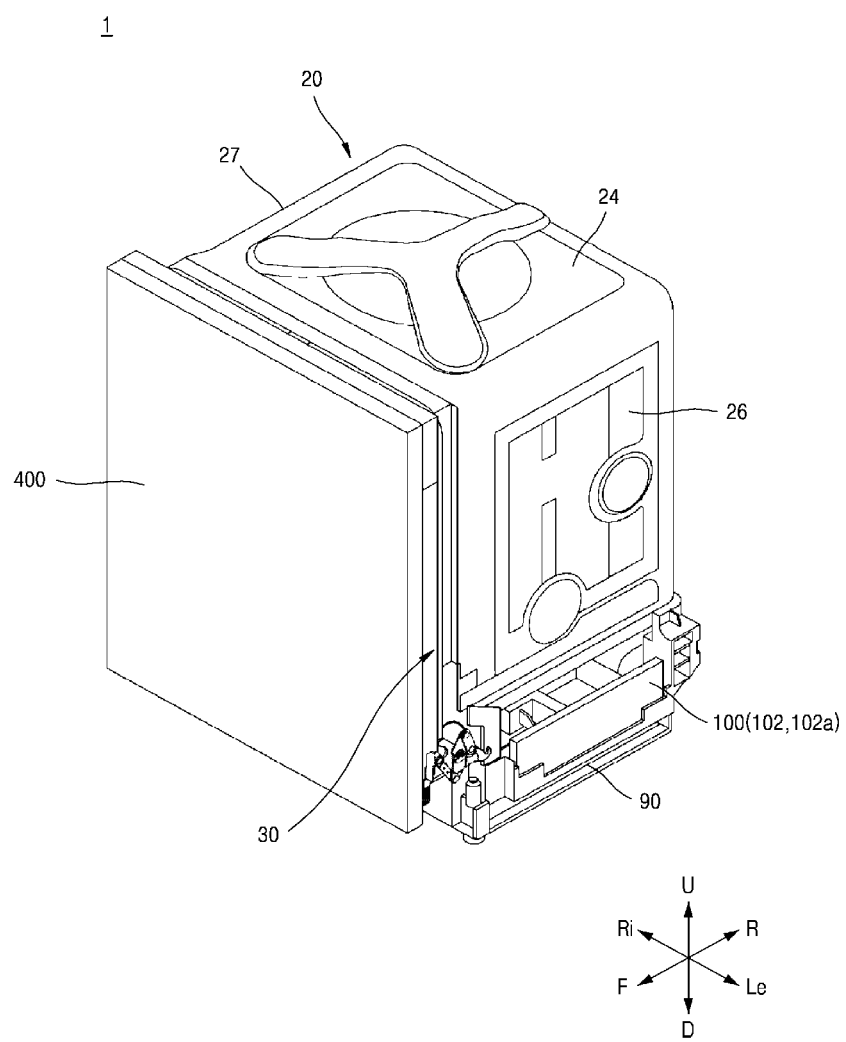
FIG. 1 is a front perspective view of a dishwasher according to an embodiment.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first". "second" and the like are used herein only to distinguish one component from another component. Thus, the components should not be limited by the terms. Certainly, a first component can be a second component unless stated to the contrary.

Throughout the disclosure, each component can be provided as a single one or a plurality of ones, unless explicitly stated to the contrary.

Hereinafter, expressions of 'a component is provided or disposed in an upper or lower portion' may mean that the component is provided or disposed in contact with an upper surface or a lower surface. The present disclosure is not intended to limit that other elements are provided between the components and on the component or beneath the component.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may like wise be utilized.

Throughout the disclosure, the terms "A and/or B" as used herein can denote A, B or A and B, and the terms "C to D" can denote C or greater and D or less, unless stated to the contrary.

Overall Structure of Dishwasher

Hereinafter, referring to the accompanying drawings, an overall structure of a dishwasher 1 according to an embodiment of the present disclosure will be described in detail.

Figure 2:
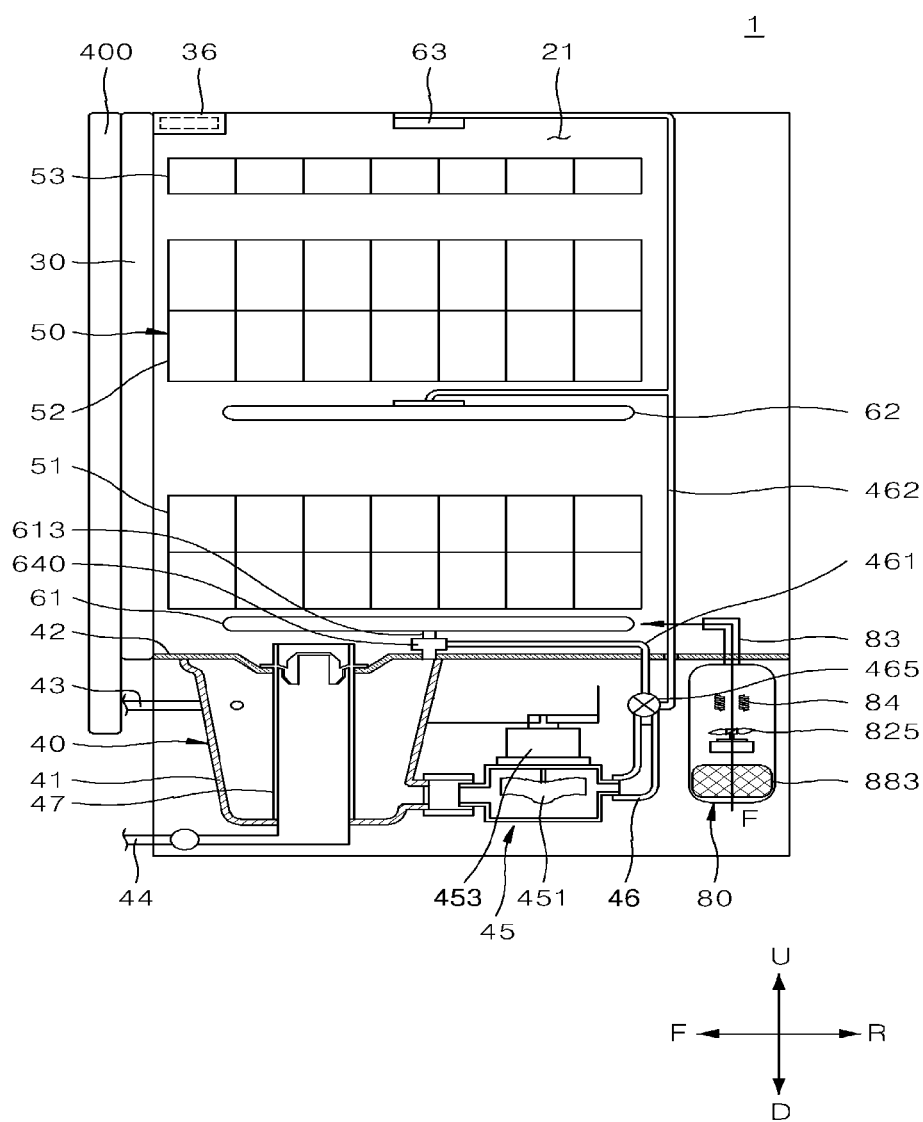
FIG. 2 is a sectional view schematically showing a dishwasher shown in FIG. 1.

FIG. 1 is a front perspective view of a dishwasher according to an embodiment. FIG. 2 is a sectional view schematically showing a dishwasher shown in FIG. 1.

FIGS. 1 and 2 show a dishwasher 1 according to an embodiment, more particularly, a built-in type dishwasher 1.

The dishwasher 1 according to an embodiment the present disclosure, which is a built-in type, may not include a separate case for covering an outer surface of a tub 10. However, according to embodiments, a case defining an exterior of the dishwasher may be provided. Hereinafter, description will be made based on the dishwasher 1 shown in FIG. 1, but unless otherwise explained, the relationship between the door 30 and the cover panel 400 may be also applied to a dishwasher equipped with a case.

Referring to FIGS. 1 and 2, the dishwasher 1 according to an embodiment of the present disclosure may include a tub 20 defining a washing space 21, in which washing targets are washed, with an open front, a door 30 for opening and closing the open front of the tub 20; a cover panel 400 coupled to a front of the door 30; a drive unit 40 disposed under the tub 20 and configured to supply, collect, circulate and discharge wash water for washing the washing target; a storage portion 50 detachably mounted in the washing space 21 of the tub 20 and accommodating the washing target; and a spray unit 60 disposed adjacent to the storage portion 50 and configured to spray wash water for washing the washing targets.

At this time, the washing targets disposed in the storage portion 50 will be referred to as dishes, such as bowls, plates, spoons and chopsticks, and other cooking utensils. Hereinafter, unless otherwise specified, The tub 20 may have a shape of a box with an open front as a whole, and it corresponds to a configuration known as a so-called washing tub.

The washing space 21 may be formed inside the tub 20 and the open front may be opened and closed by the door 30.

The tub 20 may be formed by press-processing a metal plate that is resistant to high temperature and moisture, for example, a stainless steel plate.

In addition, in case where the separate case is not provided as shown in the drawings, the upper surface 24, the right lateral surface 27, the left lateral surface 26 and the rear surface of the tub 20 may be exposed to the outside.

In addition, a plurality of brackets may be disposed on an inner surface of the tub 20, for the purposes of supporting and providing functional configurations, such as a storage portion 50, a spray unit 60, which will be described later, within the tub 20.

Meanwhile, the drive unit 40 may include a sump 41 for storing wash water; a sump cover 42 partition off the sump 41 from the tub 20; a water supply unit 43 for supplying wash water to the sump 41; a water discharge unit 44 for discharging the wash water of the sump 41 to the outside; a water supply pump 45 for supplying the wash water of the sump 41 to the spray unit 60; and a supply path 46.

The sump cover 42 may be disposed in an upper area of the sump 41, and may be configured to separate the sump 41 from the tub 20. The sump cover 42 may include a plurality of collecting holes for collecting the wash water sprayed to the washing space 21 through the spray unit 60 into the sump 41.

Specifically, the wash water sprayed toward dishes from the spray unit 60 may fall to the bottom of the washing space 210 and may be re-collected in the sump 41 after passing through the sump cover 42.

The water supply pump 45 may be provided in a side or a bottom of the sump 41 and configured to press and supply wash water to the spray unit 60.

One end of the water supply pump 45 may be connected to the sump 41 and the other end thereof may be connected to the supply path 46. The water supply pump 45 may include an impeller 451 and a motor 453, etc. When power is supplied to the motor 453, the impeller 451 may be rotated to press the wash water of the sump and the pressed wash water may be supplied to the spray unit 60 through the supply path 46.

Meanwhile, the supply path 46 may be configured to selectively supply the wash water supplied from the water supply pump 45 to the spray unit 60.

For example, the supply path 46 may include a first supply path 461 connected to a lower spray arm 61; and a second supply path 463 connected to an upper spray arm 62 and a top nozzle 63. The supply path 46 may be provided with a supply path switching valve 465 for selectively opening and closing the supply paths 461 and 463.

At this time, the supply path switching valve 465 may be controlled to sequentially open or simultaneously open the supply paths 461 and 463.

Meanwhile, the spray unit 60 may be configured to spray wash water to the dishes stored in the storage portion 50.

More specifically, the spray unit 60 may include a lower spray arm 61 disposed in a lower area of the tub 20 and configured to spray wash water to the lower rack 51; an upper spray arm 62 disposed between the lower rack 51 and the upper rack 52 and configured to spray wash water to the lower rack 51 and the upper rack 52; and a top nozzle 63 disposed in an upper area of the tub 20 and configured to spray wash water to the top rack 53 and an upper rack 52.

In particular, the lower spray arm 61 and the upper spray arm 62 may be rotatably provided in the washing space 21 of the tub 20 to spray wash water toward the dishes stored in the storage portion 50, while rotating.

The lower spray arm 61 may be rotatably supported pm an upper portion of the sump cover 42 in order to spray while rotating wash water toward the lower rack 51 from the bottom of the lower rack 51.

In addition, the upper spray arm 62 may be rotatably supported by a spray holder in order to spray wash water while rotating between the lower rack 51 and the upper rack 52.

Meanwhile, in order to enhance washing efficiency, means for switching the washing sprayed from the lower spray arm 61 upward (e.g., U-direction).

The specific configuration of the spray unit 60 is already well-known in the art to which the present disclosure pertains. Hereinafter, the description about the specific configuration of the spray unit 60 will be omitted.

Meanwhile, the storage portion 50 for storing dishes may be provided in the washing space 21.

The storage portion 50 may be retractable from the inside of the tub 20 through the open front of the tub 20.

Figure 3:
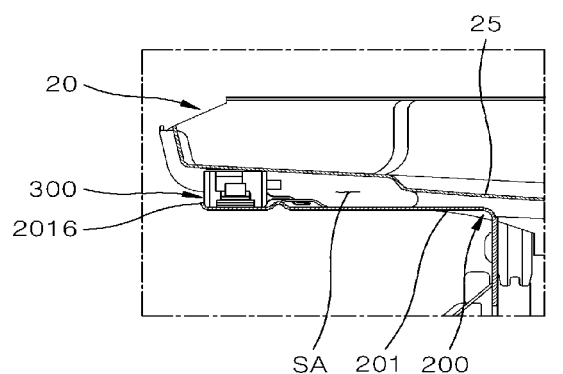
FIG. 3 show a front perspective view and a sectional view of a state where an indicator is attached to a lower frame provided in the dishwasher of FIG. 1.
Figure 3:
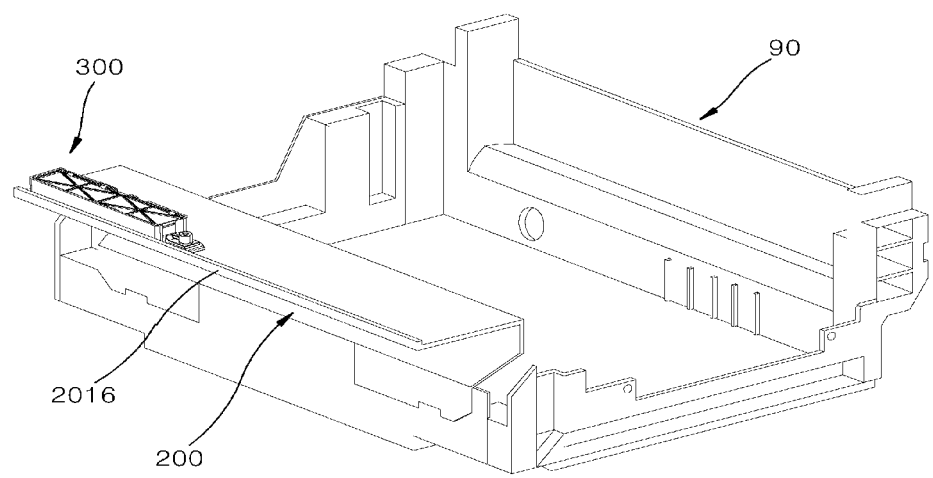
Figure 3:
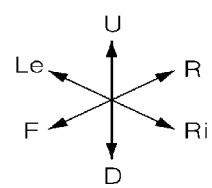

For example, FIG. 2 shows that the storage according to an embodiment may include a lower rack 51 provided in a lower area of the tub 20 to store relatively large-sized dishes; an upper rack 52 disposed above the lower rack 52 to storage middle-sized dishes; and a top rack disposed in an upper area of the tub 20 to storage small-sized dishes, however, the present disclosure is not limited thereto but description will be made based on the embodiment of the dishwasher including three storage portions 50 as shown in FIG. 3.

The lower rack 51, the upper rack 52 and the top rack 53 may be drawn to the outside through the open front of the tub 20.

For that purpose, a guide rail may be provided on both lateral walls defining an inner circumferential surface of the tub 20. For example, the guide rail may include an iupper rail, a lower rail and a top rail.

Wheels may be provided on lower portions of the lower rack 51, the upper rack 52 and the top rack 53, respectively a user can store dishes in or easily take the washed dishes from the rack 51, the upper rack 52 and the top rack 53 by pulling the racks out through the front of the tub 20.

The guide rail 54 may be provided as a simple rail type of a guide rail fixed guide rail for guiding the moving outward and inward of the spray unit 60 or a stretchable guide rail of which the outward movement distance increases.

Meanwhile, the door may have the purpose of opening and closing the open the open front of the tub 20 described above.

Normally, a hinge unit for opening and closing the door 30 may be provided at a lower area of the open front of the door 30. The door 30 may be rotated on the hinge unit as the rotation axis to open the door 30.

Here, to realize a built-in type dishwasher, a control panel may be provided on an upper surface of the door 30 and configured to control the dishwasher 1.

As shown in the drawings, the control panel may include a display visually displaying information on the current operational state of the dishwasher; a selection button for inputting the user's selecting manipulation; and a power button for inputting the user's manipulation to turn in or off the dishwasher. Since it is provided on the upper surface of the door 3, the control panel may not be exposed to the outside in a state where the door 30 is closed.

Accordingly, as will be described later, an indicator 300 may be provided to visually display the operating state of the dishwasher when the door 30 is closed. Description of the indicator 300 will be made referring to FIG. 3.

In addition, as will be described later, a first main circuit board for controlling the control panel including the display may be provided in the door 30. A first main controller controlling overall course progress of the dishwasher based on the user's manipulation input through the control panel may be provided on the first main circuit board. The first main controller and the first main circuit board may configure some parts of the control unit 100 configured to controlling the operation of the dishwasher 1, which will be described later referring to FIG. 27.

Meanwhile, an inner surface of the door 30 may define one surface of the tub 20 when the door 30 is closed, and may simultaneously define a seating surface supporting the lower rack 51 of the storage portion 50 when the door 30 is full open.

To this end, when the door 30 is full-open, the inner surface of the door 30 may form the same horizontal surface as the direction in which the guide rail 54 for guiding the lower rack 51 extends.

Meanwhile, a dry air supply unit 80 for generating and supplying high-temperature or low-temperature dry air to the washing space inside the tub may be provided under the tub 20.

As shown in the drawing, the dry air supply unit 80 may include a filter member 883 filtering external air, a blower fan 825 generating dry air flow; a heater 84 heating the dry air flow; and an airflow guide 83 disposed inside the tub to guide the dli airflow.

A dry air supply hole may be provided on a lower surface of the tub 20 to introduce the high-temperature dry air generated in the dry air supply unit into the tub.

The cover panel 400 may be attached disposed on the outside of the door 30 to form an exterior design of the front surface of the dishwasher 1.

In particular, the cover panel 400 may serve to form a sense of unity with surrounding furniture where the dishwasher 1 is accommodated. In this way, in order to crease the sense of unity with the surrounding furniture, the cover panel 400 may be manufactured to have the same texture and color as the exterior of surrounding furniture.

The cover panel 400 may be disposed in front of the door 30 and may be movable relative to the door 30. For example, when the door 30 is rotated to be opened, the cover panel 400 may be moved along a longitudinal direction of the door 30. In order to ensure the relative movement of the cover panel described above, a lower end of the cover panel 400 may be spaced upward at a predetermined distance from the outer bottom floor F on which the dishwasher 1 is supported.

For such the relative movement, a link module for relatively moving the cover panel 400 along the longitudinal direction of the door 30 may be provided.

Meanwhile, the dishwasher 1 according to an embodiment of the present disclosure may further a base 90 disposed below the tub 20 to serve to support the tub 20 in the direction of gravity.

The base 90 may serve to accommodate and support the functional modules such as the drive unit 40 and the dry air supply unit 80 described above.

To this end, the functional modules such as the drive unit 40 and the dry air supply unit 80 may be disposed inside the base 90, and an internal space may be provided to accommodate those functional modules.

The base 90 may be manufactured through plastic injection molding so that a somewhat complex structure for accommodating and supporting the plurality of functional modules may be integrally formed, In addition, a second main controller 102 and a second main circuit board 102*a* which constitute another part of the control unit 100 controlling the operation of the dishwasher 1, may be arranged in the base 90 in a box shape.

The second main controller 102 may be configured to control the operations of the drive unit 40 and the dry air supply unit 80, and determined presence of normal operations.

FIG. 1 shows that a control box, in which the second main controller 102 and the main circuit board 102a are disposed, is disposed on a left end surface of the base 90, although the present disclosure is not limited thereto, hereinafter, the present disclosure will be described based on the embodiment in that the control box is disposed on the left end surface of base 90.

The second main controller 102 and the second rain circuit board 102a may be electrically connected to the first main controller 101 and the first main circuit board 101a to exchange mutual electrical control signals and electrical information, the configuration of the electrical connection relationship between them will be described later, referring to FIG. 27.

Indicator Arrangement Structure and Fixing Means

Hereinafter, referring to FIGS. 3 to 6, the arrangement structure and fixing means of the indicator 300 provided in the dishwasher 1 according to an embodiment of the present disclosure will be described.

As described above, the indicator 300 may project a visual light beam onto the external floor F on which the dishwasher 1 is supported and perform the function of displaying certain information regarding the operating state of the dishwasher 1 as a visual image.

In particular, the indicator 300 ray be configured to project a visual light beam toward the space formed between the rear surface of the door 30 and the front surface of the base 90 to create a visual image on the external bottom floor F.

To this end, the indicator 300 may extend forward and upward (e.g., U-direction) from a front end surface of the base 90, to be fixedly attached to a lower frame 200 covering the lower surface 25 of the tub 20.

Figure 4:
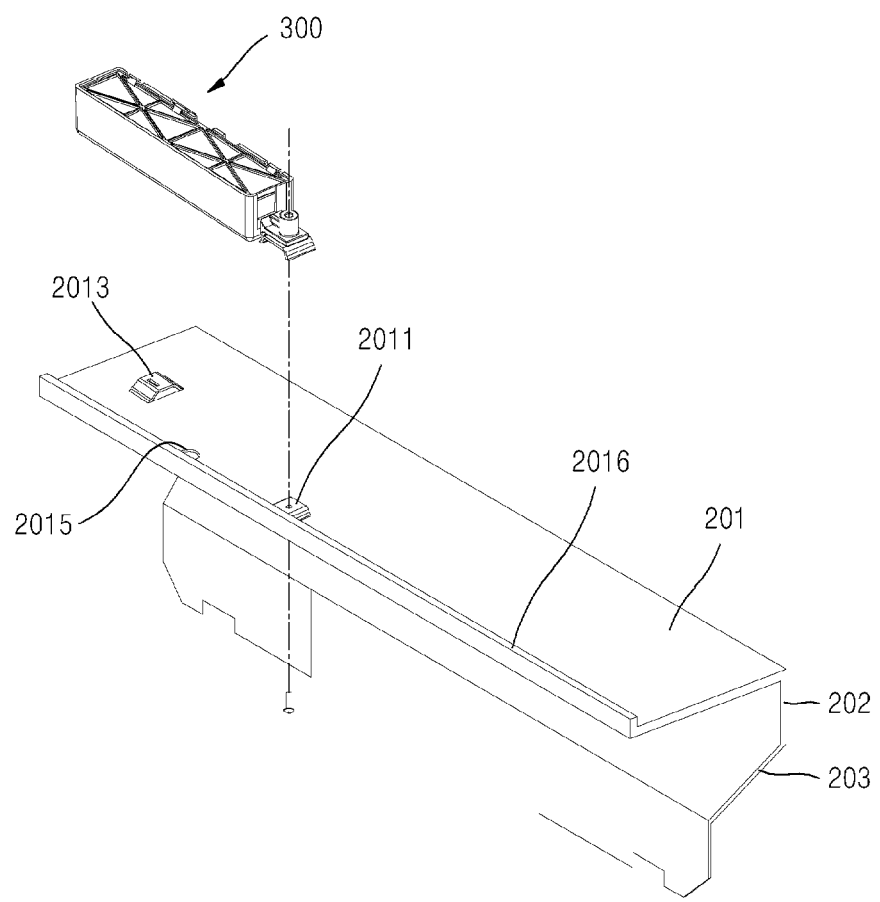
FIG. 4 is a front perspective view showing a state where an indicator is decoupled from a lower frame shown in FIG. 3.

As shown in FIGS. 3 and 4 as one example, the lower frame 200 may include a horizontal extension 201 extending approximately in a horizontal direction to cover the lower surface 25 of the tub 20 from below; a base connection portion 203 attached to a front end surface of the base 90; and a vertical extension 202 formed between the horizontal extension 201 and the base connection portion 203.

The base connection portion 203 may be a portion attached to the front end surface of the base 90. For this purpose, the base connection portion 203 may be formed to have a shape corresponding to the shape of the front end surface of the base 90, so as to increase the connection strength with the base 90 and the contact area with the base 90.

The vertical extension 202 may be configured to connect an upper end of the base connection portion 203 and a rear end of the horizontal extension 201 with each other, and hide the partially open front end surface of the base 90.

To this end, the vertical extension 202 may extend substantially parallel to the vertical direction so as to effectively cover the partially open front end surface.

As described above, the horizontal extension 201 may cover the lower surface of the tub 20 from below. At this time, the horizontal extension 201 may be disposed so that the horizontal extension 201 and the lower surface 25 of the tub 20 can be separated from each other. Accordingly, a predetermined space SA may be formed between the horizontal extension 201 and the lower surface 25 of the tub 20.

The horizontal extension 201, the vertical extension 202 and the base connection portion 203 may be integrally formed through press processing of a metal plate-shaped member with approximately uniform thickness.

To effectively project the visible light beam toward the external bottom floor F, the indicator 300 may be arranged and fixed on the horizontal extension 201 constituting the lower frame 200, preferably, on an upper surface of the horizontal extension 201.

Since the indicator 300 is configured to be arranged and fixed on the upper surface of the horizontal extension 21 as described above, interference between the lower end of the door 30 and the lower end of the cover panel 400 and the indicator 300 when the door is rotated to be open may be prevented.

In addition, the indicator 300 may be disposed in the space SA formed between the horizontal extension 201 and the lower surface 25 of the tub 20.

As shown in the partially enlarged view of FIG. 3, the lower surface 25 of the tub 20 may form a converging slope of which the vertical height gradually decreases as it moves backward.

Accordingly, the space SA formed between the lower surface 25 of the tub 20 and the horizontal extension 201 of the lower frame 200 may have a shape in which the width in the vertical direction or the gap in the vertical direction gradually becomes narrower as it moves backward.

In order to secure the installation space of the indicator 300 as much as possible while considering the shape of the space SA, the indicator 300 may be disposed close to the front end of the horizontal extension 201 where the vertical width of the space SA can be maximized.

However, the vertical width of the space SA at the front end of the horizontal extension 201 of the lower frame 200 may be inevitably relatively narrow, and the height of the indicator 300 is inevitably limited by the vertical width of the space SA.

Considering that, as shown in FIGS. 3 and 4, the indicator 300 may be disposed in the space SA so that the left-right direction of the indicator may be the longitudinal direction.

That is, since the vertical height and the front-rear direction of the indicator 300 is inevitably limited by the space SA, the indicator 300 may be formed to have the left-right width which is a relatively large value.

Meanwhile, as shown in FIGS. 3 and 4, a bent portion 2016 bent upward (e.g., U-direction) may be provided at a front end of the horizontal extension 201.

The bent portion 2016 may be configured to increase the strength of the front end of the horizontal extension 201 which becomes a free end.

For example, the bent portion 2016 may be formed by bending the front end of the horizontal extension 201, which becomes a free end, in the upward direction, and may extend along the left-right direction (e.g., Le-RI direction) as a barrier of which the height in the vertical direction is approximately constant.

Meanwhile, at least predetermined area of the bent portion 2016 may be formed at the front end of the horizontal extension 201.

In the embodiment shown in the drawings, the bent portion 2016 may be formed by bending the entire front end of the horizontal extension 201. Hereinafter, the present disclosure will be described based on the embodiment in that the bent portion 2016 is formed by bending the entire front end of the horizontal extension 201. However, the present disclosure is not limited thereto, it is possible to partially form the bent portion 2016 at the front end of the horizontal extension 201.

With the above-noted reason, a front surface 310c of the indicator 300 may be disposed to contact with the bent portion 2016 so that the indicator 300 can be disposed as closely in front of the space SA as possible.

Accordingly, the bent portion 2016 may serve as a positioning function to assemble the indicator 300 and as a stopper configured to prevent the indicator 300 from moving forward after assembly.

Meanwhile, as described above, the indicator 300 may be disposed and fixed on an upper surface of the horizontal extension 201 of the lower frame 200.

For example, the indicator 300 may be coupled to the horizontal extension 201 of the lower frame 200 at two positions. That is, two coupling means of the indicator 300 may be provided, and may include first coupling means and a second coupling means.

Based on the state where the indicator 300 is disposed on the horizontal extension 201, the first coupling means may be a first connection tap 311 provided on a left lateral surface of the indicator 300.

More specifically, the first connection tap 311 may include a main body 3111 having a right end integrally formed with a left lateral surface of the holder 310 and a left end which becomes a free end; and a fastening boss 3112 extending upward (e.g., the U-direction) from an upper surface of the main body 3111.

As shown in the drawing, the main body 3111 may be formed in a plate shape in which the front-rear width and the left-right width are much larger than the vertical thickness to maximize the contact area with the upper surface of the horizontal extension 201 of the lower frame 200.

The fastening box 3112 may have a cylindrical shape protruding upward (e.g., U-direction) from the upper surface of the main body 3111, and may be integrally formed with the main body 3111.

As shown in FIG. 4, a fastening hole to which a fastener (e.g., a fastening bolt) is screw-fastened may be formed inside the fastening box 3112.

Meanwhile, a reinforcing rib 3113 may be integrally formed between the fastening box 3112 and the main body 3111 to increase the connecting strength of them.

In response to the first connection tap 311, a fastening hole 2012 may be formed in the horizontal extension 201 of the lower frame 200 so that the above-noted fastener can penetrate the fastening hole 2012.

At this time, the fastening hole 2012 may be formed in a first bead forming portion 2011 formed by deforming the horizontal extension 201 to protrude upward (e.g., U direction).

Meanwhile, based on the state where the indicator 300 is disposed in the horizontal extension 201, the second fastening means may be a second connection tab 312 provided adjacent to a right lateral surface of a holder 310 as a rear surface of the holder 310 of the indicator 300.

More specifically, the second connection tab 312 may have a front end integrally formed with the rear surface of the holder 310 of the indicator 300 and a rear end that becomes a free end.

With a similar reason to the first connection tab 311, the second connection tab 312 may be fastened to the horizontal extension 201 of the lower frame 200 without adding a separate fastener.

However, unlike the first connection tab 311, the second connection tab 312 may be fastened to the horizontal extension 201 of the lower frame 200 without adding a separate fastener.

More specifically, the second connection tab 312 may have a cross section that has a zigzag shape. That is, the second connection tab 312 may include a first extension 3121 integrally formed with a rear surface of the holder 310; a second extension 3123 extending rearward at a lower position than the first extension 3121 based on the vertical direction; and a bent portion 3122 connecting the first extension 3121 and the second extension 3123.

In other words, the vertical-direction position of the second extension 3123 forming the rear end of the second connection tap 312 may be lower than the vertical-direction position of the first extension 3121 forming a front end thereof.

Due to such the cross-sectional shape, the second connection tap 312 may be coupled to an inserting hole 2014 formed in the horizontal extension 201 of the lower frame 200 in the manner of simple inserting, but the front-rear direction movement of the second connection tab after being inserted may be restricted by the inserting hole 2014 due to the cross-sectional shape forming a step.

The inserting hole 2014 may be processed to have a slit shape in which the left-right direction width is much larger than the front-rear direction width to facilitate the inserting of the second extension 3123.

Through this, the second connection tab 312 may be easily and stably fastened to the inserting hole 2014 without a separate fastener.

Similar to the fastening hole 2012, the inserting hole 2014 may be formed in a second bead forming portion 2013 formed by partially deforming the horizontal extension 201 to protrude upward (e.g., U-direction).

Through the single fastener as described above, the indicator 300 may be stably fixed to the horizontal extension 201 of the lower frame 200, thereby minimizing the number of fastening man-hours and fastening members for the indicator 300.

Figure 5:
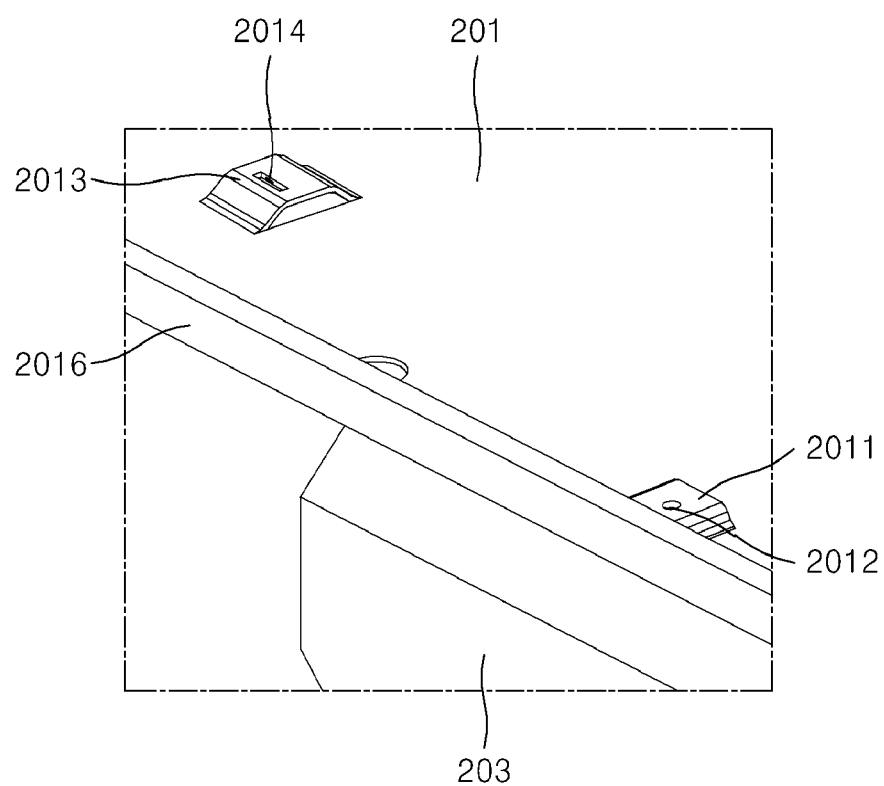
FIG. 5 is a partially enlarged view of FIG. 4.
Figure 6:
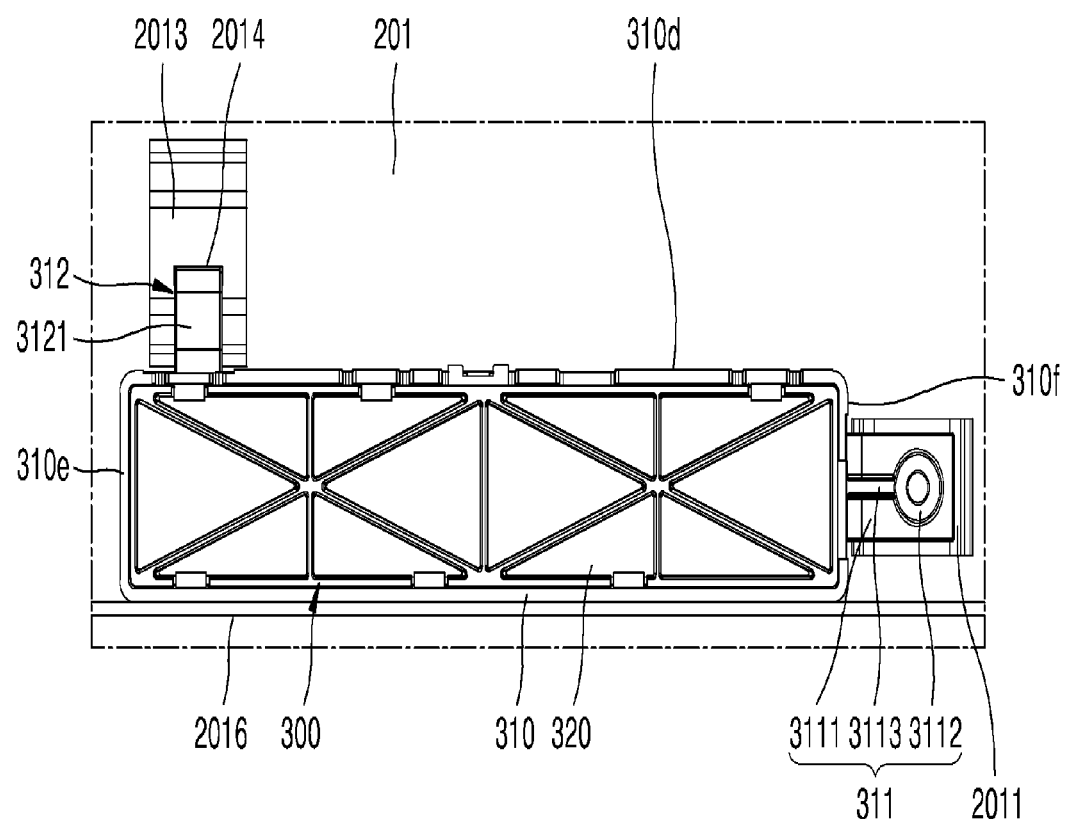
FIG. 6 is a partially enlarged plane view showing a state where an indicator is attached to a lower frame.
Figure 7:
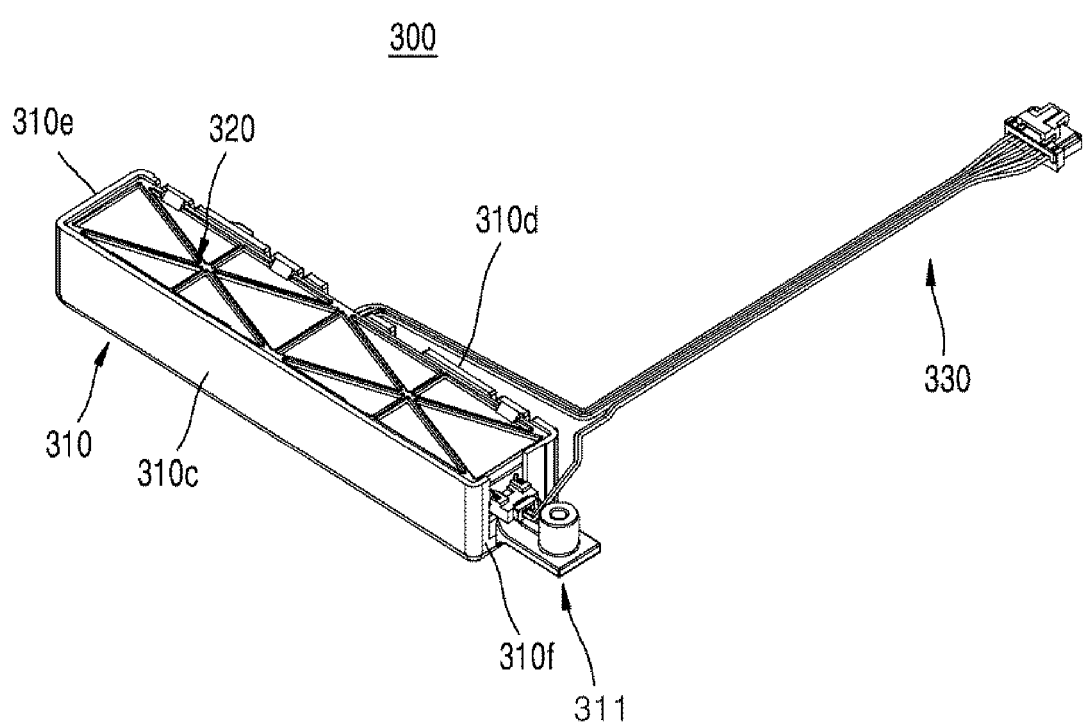
FIG. 7 is a front perspective view showing a state where a harness module is coupled to an indicator provided in a dishwasher according to an embodiment.
Figure 7:
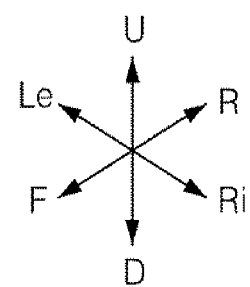
Figure 8:
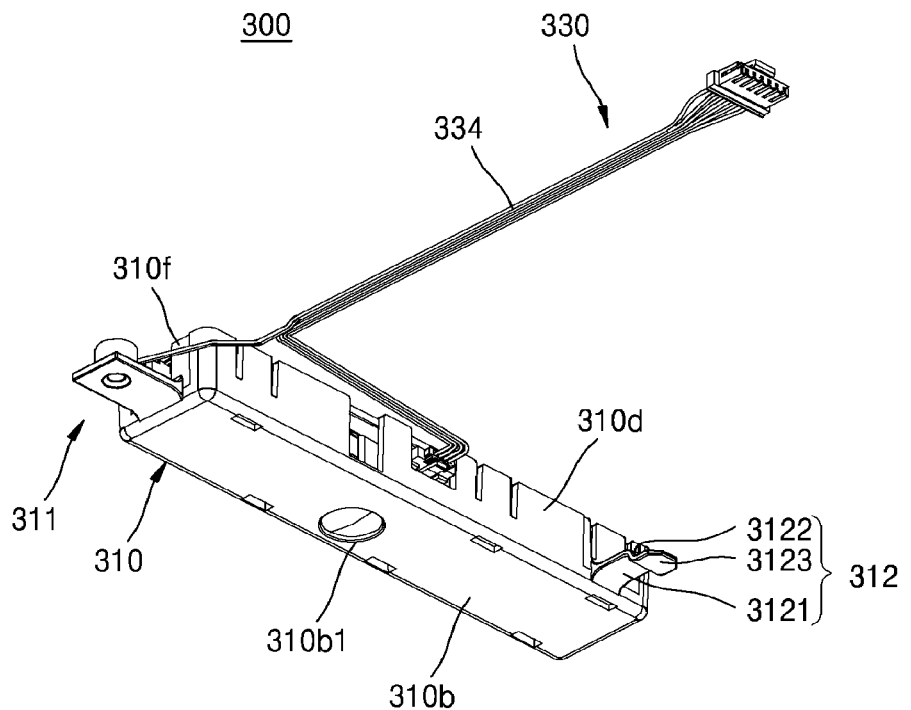
FIG. 8 is a bottom perspective view of FIG. 7.
Figure 8:
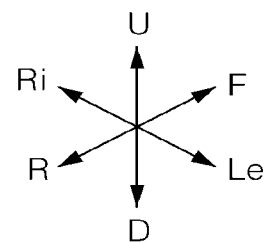

Meanwhile, as shown in FIGS. 4 and 5, a second light transmission hole 2015, through which a visible light beam generated through the indicator 300 can pass, may be formed between the first bead forming portion 2011 and the second bead forming portion 2013.

Based on a state where the arrangement and assembly of the indicator 300 is completed, the second light transmission hole 2015 may be formed at a position that is centric with the first light transmission hole 310b formed through a lower surface 310b of the holder 310 of the indicator 300, which will be described later.

Overall Configuration of Indicator

Hereinafter, referring to FIGS. 7 to 11, the overall configuration of the indicator 300 provided in the dishwasher 1 will be described according to an embodiment of the present disclosure.

As shown in the drawings, the indicator 300 may include a holder 310 in which an accommodating space is formed; a light source module 340 accommodated in the accommodating space and configured to generate a visible light beam; a first lens 350 configured to refract the visible light beam generated by the light source module 340; an LCD module 360 configured to generate a visual image by partially shielding the visible light beam after passing through the first lens 350; a reflector 370 configured to change the path of the visible light beam passing through the LCD module 360 toward the external bottom floor F; and a second lens 380 configured to refract the visible light beam of which a moving path has been switche.

The holder 310 may form an outer body of the indicator 300, and may be configured to accommodate and protect functional modules constituting the indicator 300.

To this end, based on a state where the indicator 300 is arranged and fixed to the horizontal extension 201 of the lower frame 200, the holder 310 may have a box shape having an entirely open top surface 310a.

The light source module 340, the first lens 350, the LCD module 360, the reflector 370 and the second lens, which constitute the functional modules of the indicator 300, may be assembled inside the holder 310 while entering the inside of the holder 310 in a sliding manner.

Inside the holder 310, a separate support structure and fixing structure of the functional modules such as the light source module 340, the first lens 350, the LCD module 360, the reflector 370 and the second lens 380 may be integrally formed with the holder 310.

The separate support structure and fixing structure for the light source module 340, the first lens 350, the LCD module 360, the reflector 370 and the second lens 380 will be described later, referring to FIG. 12.

Meanwhile, the holder may be fabricated by plastic-injection molding so that the various complex structures including the separate support structure and the fixing structure of the functional modules integrally formed with each other can be provided in the holder 310.

The light source module 340 may be accommodated in the accommodating space inside the holder 310 and configured to generate a visible light beam.

Figure 9:
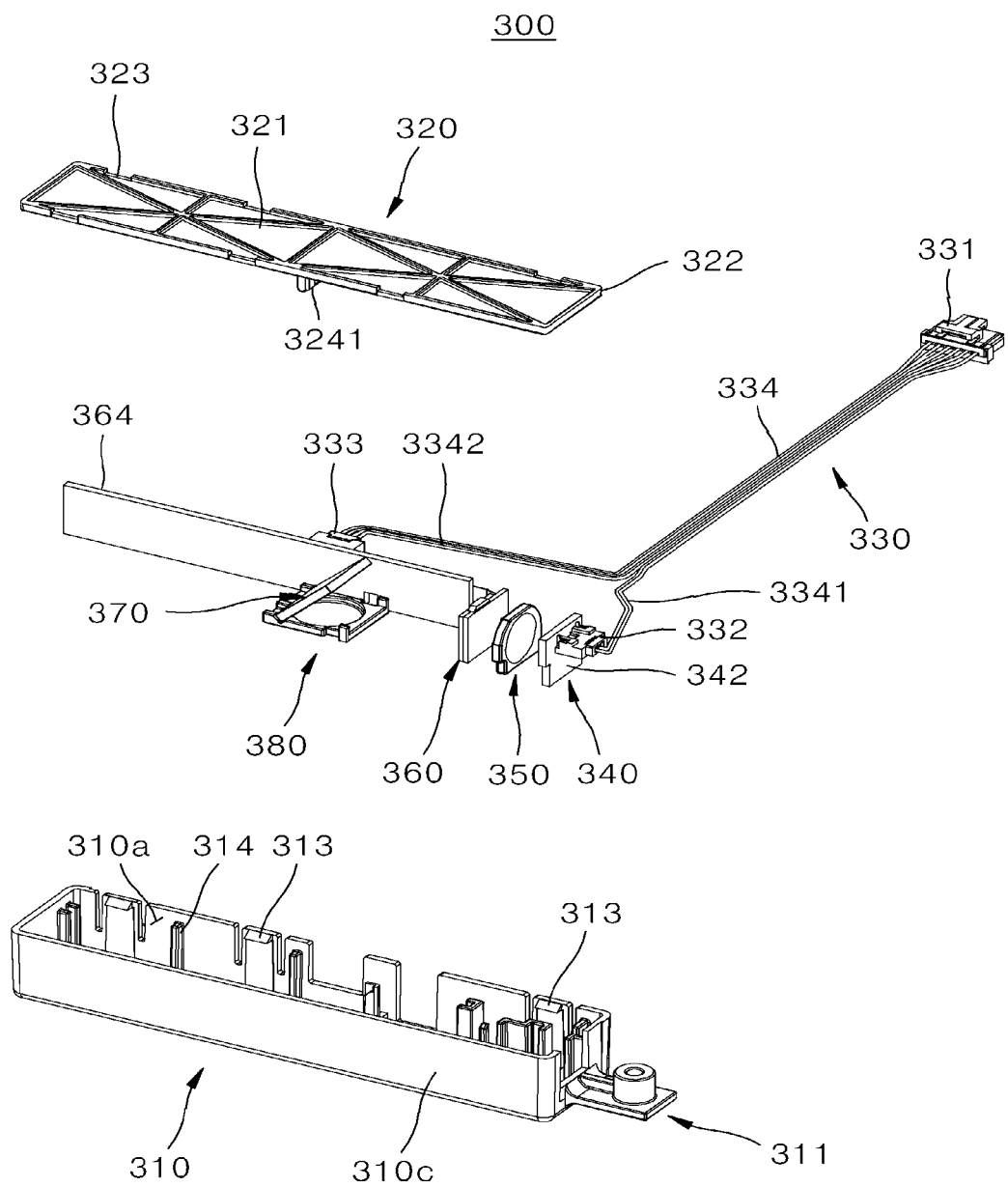
FIGS. 9 and 10 are exploded perspective views of the indicator and the harness module shown in FIG. 7.
Figure 10:
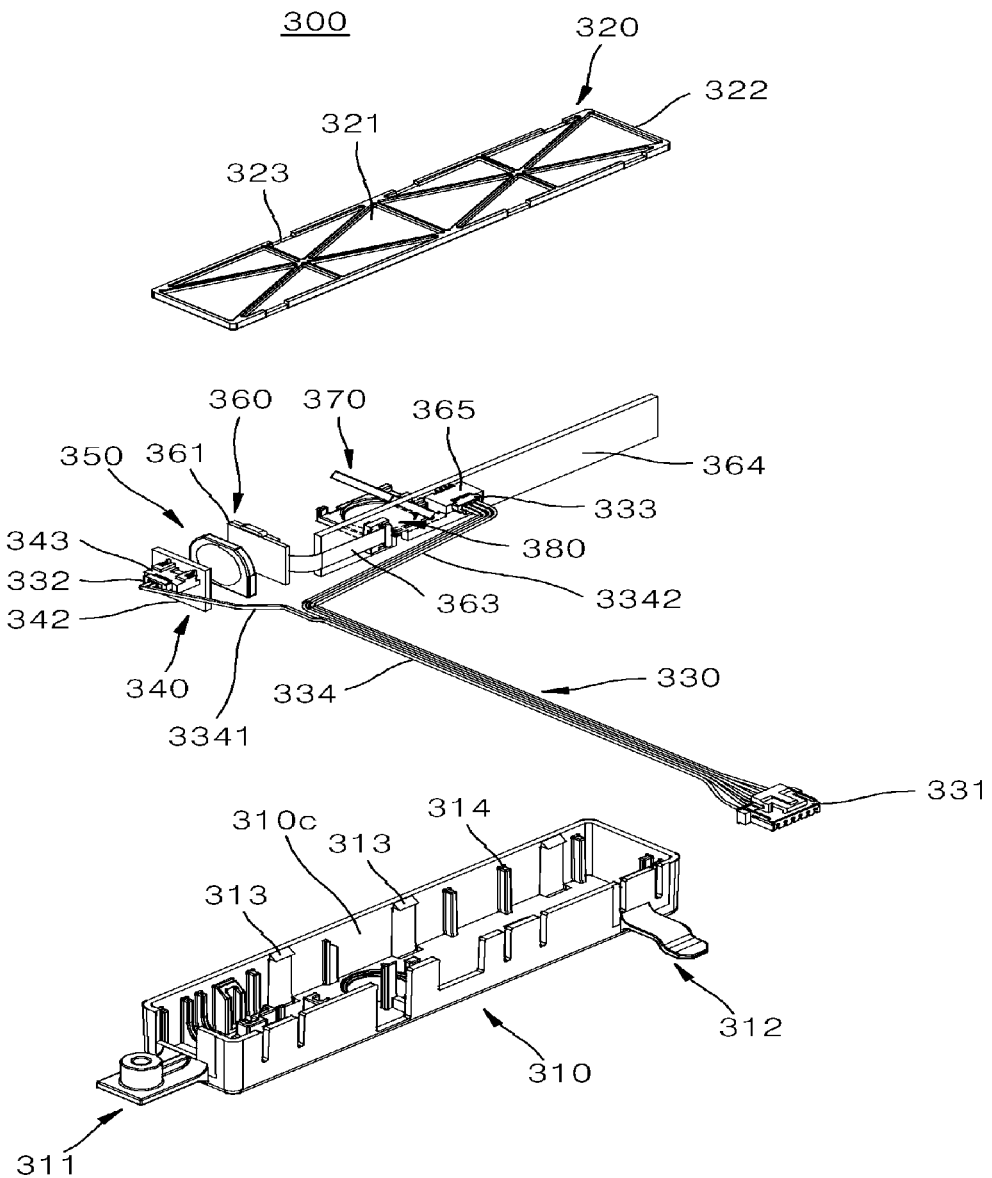
Figure 11:
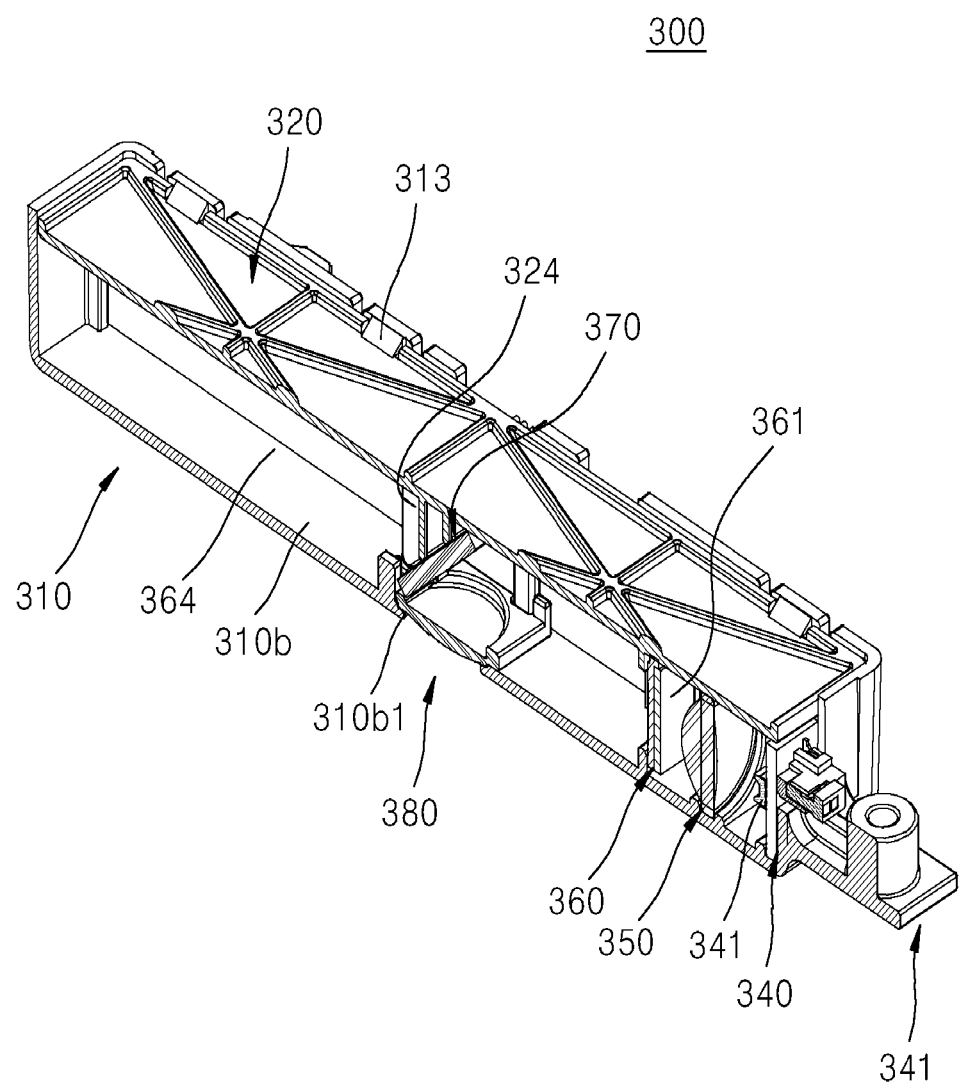
FIG. 11 is a sectional view cut away along a longitudinal direction of the indicator shown in FIG. 7.

FIGS. 9 to 11 show an embodiment in that the light source module 340 is disposed adjacent to a left lateral surface 310f of the holder as one example. However, the present disclosure is not limited thereto but it will be described based on the embodiment shown in the drawings.

The light source module 340 may include a light source element 341 configured to generate a visible light beam; a first circuit board 342h having one lateral surface on which the light source element 341 is mounted; and a first board connector 343 mounted on the other lateral surface of the first circuit board 342.

The light source element 341 may be a single LED element or a plurality of LED elements as one example.

FIG. 9 shows an embodiment to which the single LED element is applied, but the present disclosure is not limited thereto for convenience, the present disclosure will be described based on the embodiment in that a single LED is provided as the light source element 341.

The light source element 341 may be mounted on a light lateral surface of the first circuit board 342 to project the visible light beam toward the accommodating space inside the holder 310.

Meanwhile, a first board connector 343 may be mounted on a left lateral surface opposite to the right lateral surface on which the light source element 341 is mounted.

A first terminal 332 of a first cable 3341 of a harness module 330, which will be described later, may be electrically connected to the first board connector 343.

The light source element 341 and the first board connector 343 may be mounted on the first circuit board 342 and the first circuit board 342 can support them.

As shown in the drawings, the first circuit board 342 may have a shape of a plate with a substantially uniform thickness, and may be accommodated in the holder 310 so that its thickness direction can be parallel to the longitudinal direction of the holder 310. That is, the first circuit board 342 may be disposed in the accommodating space of the holder 310 so that its right lateral surface, on which the light source and which is oriented approximately parallel to the left lateral surface 310f of the holder 310, can be perpendicular to the longitudinal direction of the holder 310.

As will be described later, a first slot S1 may be formed very close to the left lateral surface 310f of the holder 310 to accommodate and support the first circuit board 342 inside the holder 310.

The first lens 350 may be configured to refract the visible light beam generated in the light source element 341 of the light source module 340.

More specifically, the first lens 350 may be configured to refract the visible light bear generated and diffused by the light source element 341 to travel straight along a horizontal direction.

For the purpose, the first lens 350 may be aligned on the right side of the first circuit board 342 in parallel.

In order to refract the visible light beam, a refracting portion having convex lens shape may be formed in the center of the right lateral surface of the first lens 350 to be convex toward the LCD panel 361 of the LCD module, which will be described later.

As it will be described later, a second slot S2 for accommodating and supporting the first lens 350 may be formed inside the holder 310, while being continuously formed with the first slot S1, in parallel.

The specific configuration of the first lens 350 will be described later, referring to FIG. 16.

The LCD module 360 may be configured to generate a visual image by partially blocking the visible light beam having passed through the first lens 350.

More specifically, the LCD module 360 may include a LCD panel 361 through which the visible light beam partially passes; a shielding plate 362 limiting the passage area of the visible light beam having passed through the LCD panel 361; and a second circuit board 364 electrically connected with the LCD panel 361 and controlling the operation of the LCD panel.

The LCD panel 361 may serve to image predetermined information related to the operation of the dishwasher 1 by partially blocking the visible light beam refracted while passing through the first lens 350. For this purpose, the LCD panel 361 may be disposed parallel with the first lens 350 and the first circuit board 342 on the right side of the first lens 350, and ray be disposed to directly block the path of the visible light beam having passed through the first lens 350.

The LCD panel 361 may be electrically connected and linked to the second circuit board 364 disposed in the holder 310, in a state of being physically separated from the LCD panel 361 from the LCD panel 361 through a flat cable 363.

Meanwhile, conventional means well known in the art to which the present disclosure pertains may be applied as the LCD panel 361. Accordingly, specific configurations of the LCD panel 361 will be omitted.

The shielding plate 362 may be configured to limit the passage area of the visible light beam having passed through the LCD panel 361. For this purpose, the shielding plate 362 may be attached and fixed to the right lateral surface of the LCD panel 361.

In the shown embodiment, a rectangular hole may be provided inside the shielding plate 362. That is, while the visible light beam is passing through the shielding plate 362, a visible light beam area having an overall square shape may be formed. As it will be described later, a display area A having a square shape may be formed on the external bottom floor F, and a predetermined image generated by the LCD panel 361 may be formed in the display area A.

However, the present disclosure is not limited thereto, the shape of the hole formed in the shielding plate 362 may be changed and applied if necessary. For example, if a circular hole is provided, a circular-shaped display area may be formed on the external bottom floor F.

A plurality of circuit elements for controlling the operation of the LCD panel 361 may be mounted on the second circuit board 364 to support the circuit elements.

As shown in the drawings, a plurality of circuit elements; a LCD panel connector 366 to which the above-noted flat cable 363 is linked; and a second board connector 365 to which a second terminal 333 of a second cable 3342 of a harness module 330, which will be described later, may be mounted on the second circuit board 364 to be supported.

Accordingly, as shown in the drawings, the area of the second circuit board 364 may the largest size among the functional modules constituting the indicator 300.

Considering the size and area of the second circuit board 364, the second circuit board 364 may be disposed inside the holder 310 in a state of being separated from the LCD panel 361 and the first circuit board 342.

In addition, considering the shape of the space SA where the holder 310 is disposed, the second circuit board may be disposed in the accommodating space of the holder 310 with the longitudinal direction parallel to that of the holder 310.

That is, the second circuit board 364 may be formed to have a rectangular shape in which the length of a long side is much larger than that of a short side, and may be disposed in the holder 310 so that the long side direction can be parallel to the longitudinal direction of the holder 310.

At this time, considering the positions where the LCD panel connector 366 and the second board connector 365 are mounted, the second circuit board 364 may be disposed adjacent to the rear surface 310d of the holder 310, in parallel to the rear surface of the holder 310.

As it will be described later, a third slot 33 and a fourth slot S4 for accommodating and supporting the LCD panel 361 and the second circuit board 364 in a state of being separated.

The reflector 370 may be disposed on the right side of the LCD panel 361 and configured to divert the traveling path of the visible light beam having passed through the LCD panel 361 toward the external bottom floor F.

To divert the traveling path of the visible light beam, the left lateral surface of the reflector 370 acting as a reflective surface may be disposed in the holder 310, while being tilted at a predetermined inclination angle with respect to the vertical direction.

As shown in the embodiment, when diverting the visible light beam traveling along the horizontal direction to the vertical direction, the reflector 370 may be inclined at an inclination angle of approximately 45 degrees with respect to the vertical direction.

For example, the reflector 370 may have a plate shape in which a right lateral surface is a reflective surface.

Stopper ribs 315e1 and 315e2 may be provided in the holder 310 as structures for supporting the reflector 370 that is inclined.

The stopper ribs 315el and 315e2 may be configured to guide the installation position of the second lens 380 and prevent the separation of the second lens 350, which will be described later.

In this way, the support structure of the reflector 370 and the second lens 380 using the stopper ribs 315e1 and 315e2 will be described later, referring to FIGS. 2 to 26.

Meanwhile, the second lens 380 may be configured to refract the visible light beam of which the traveling path is diverted by the reflector 370. In this way, the first lens 350, the reflector 370, and the second lens 380 can be referred to as an optical module because they have a function for changing the traveling path of the visible light beam or refracting the visible light beam.

More specifically, the second lens 380 may serve to refract the visible light beam of which the traveling path has been changed to the vertical direction by the reflector 370.

To this end, the second lens 380 may be disposed and fixed on the lower surface 310b of the holder as a position below the reflector 370.

For the refraction of the visible light beam, a refracting portion having a convex lens shape that is convex toward the external bottom floor F may be formed in the center of the lower surface of the second lens 380 with respect to the state of being fixed to the lower surface 310b of the holder 310.

The first light transmission hole 310b1 described above may be formed on the lower surface 310b of the holder 310 below the refracting portion of the second lens 380.

At this time, the refracting portion 381 of the second lens 380 may be disposed in the holder 310 to be approximately concentric with the first light transmission hole 310b1.

In addition, the refracting portion 381 of the second lens 380 may be disposed to be partially inserted in the first light transmission hole 310b1 and not to protrude beyond the first light transmission hole 310b1.

Through this, the visible light beam refracted while passing through the second lens 380 may be projected toward the external bottom floor F after passing through the first light transmission hole 310b1 formed in the holder 310 and a second light transmission hole 2015 formed in the horizontal extension 201 of the lower frame 200.

The second lens 380 may have an installation position guided and prevented from separation by the stopper ribs 315el and 315eb supporting the reflector 370 as described above.

Meanwhile, the indicator 300 may further include a cover 320 coupled to the open top surface 310a of the holder 310.

The cover 320 may include a plate-shaped cover body 321 detachably coupled to the cover 320 while completely covering the open top surface 310a of the holder 310.

Corresponding to the shape of the open top surface 310a of the holder 310, the cover body 321 may be formed in a rectangular plate shape.

As shown in FIGS. 9 to 11, the cover body 321 may be coupled to the holder 310, in a state of being inserted into the holder 310 after passing through the open top surface 310a of the holder 310.

That is, an edge forming a circumferential surface of the cover body 321 may be in close contact with the inner surface of the holder 310.

Accordingly, in order to increase the contact area with the inner surface of the holder 310 and the strength of the cover body 321, an edge rib 322 having a barrier shape extending upward (e.g., U-direction) along an outer circumferential surface may be formed in the cover body 321.

As it will be described later, a plurality of hooking protrusions 313 formed on a front upper end and a rear upper end of the holder 310 with a hook shape may be detachably coupled to the cover body 321.

For the hook-coupling of the plurality of hooking protrusions 313, the edge rib may have 322a notch 323 formed at a position corresponding to the plurality of hooking protrusions 313.

Accordingly, when the cover 320 is completely coupled to the holder 310, the upper surface of the cover 320 may be hooked to the hooking protrusions 313 so that upward movement of the cover may be limited. Further, a lower surface of the cover 320 may be in contact with an upper end of a cover support rib 314 provided on an inner area of the front surface and a rear area of the lower surface of the holder 310, which will be described later, so that downward movement of the cover may be limited.

Meanwhile, a plurality of ribs protruding upward may be further formed on the upper surface of the cover body 321 to be connected with the edge rib 322 as shown in the drawings.

The cover 320 may further function to prevent the functional modules of the indicator 300 accommodated and protected in the holder 310 from separated upward (e.g., U-direction) as described above.

As it will be described later, in a state where the first circuit board 342 of the light source module 340 is inserted into the first slot S1, the first lens 350 is inserted into the second slot S2, the LCD panel 361 is inserted into the third slot S3, and the second circuit board 364 is inserted in the fourth slot S4, the upward movements of the first circuit board 342, the first lens 350, the LCD panel 361 and the second circuit board 364 may be limited by the lower surface of the cover body 321/

That is, the lower surface of the cover body 321 may serve as a stopper surface preventing the first circuit board 342, the first lens 350, the LCD panel 361 and the second circuit board 364 from being moved upward and separated.

In addition, a support rib 3241 for preventing the upward movement and separation of the reflector 370 and the second lens 380 among the functional modules may integrally protrude toward downward (e.g., D-direction) from a lower surface of the cover body.

Specific configuration of the support rib 3241 will be described later, referring to FIGS. 25 and 26.

[Specific Configuration of Holder and Functional Module Installation Process]

Hereinafter, referring to FIGS. 12 to 26, the specific structure of the holder 310 and a process of installing each of the functional modules in the holder 310 will be described.

Figure 12:
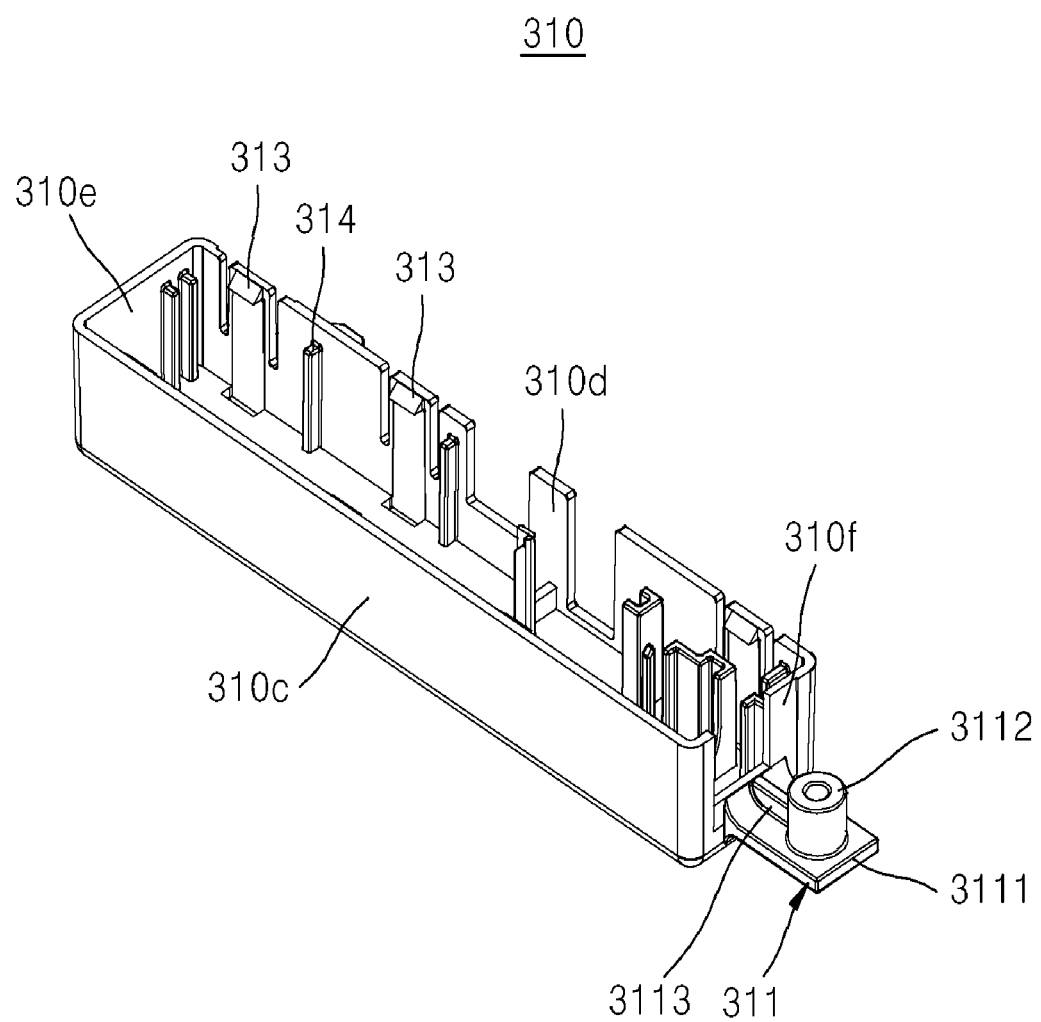
FIG. 12 is a front perspective view of a holder provided in the indicator of FIG. 7
Figure 13:
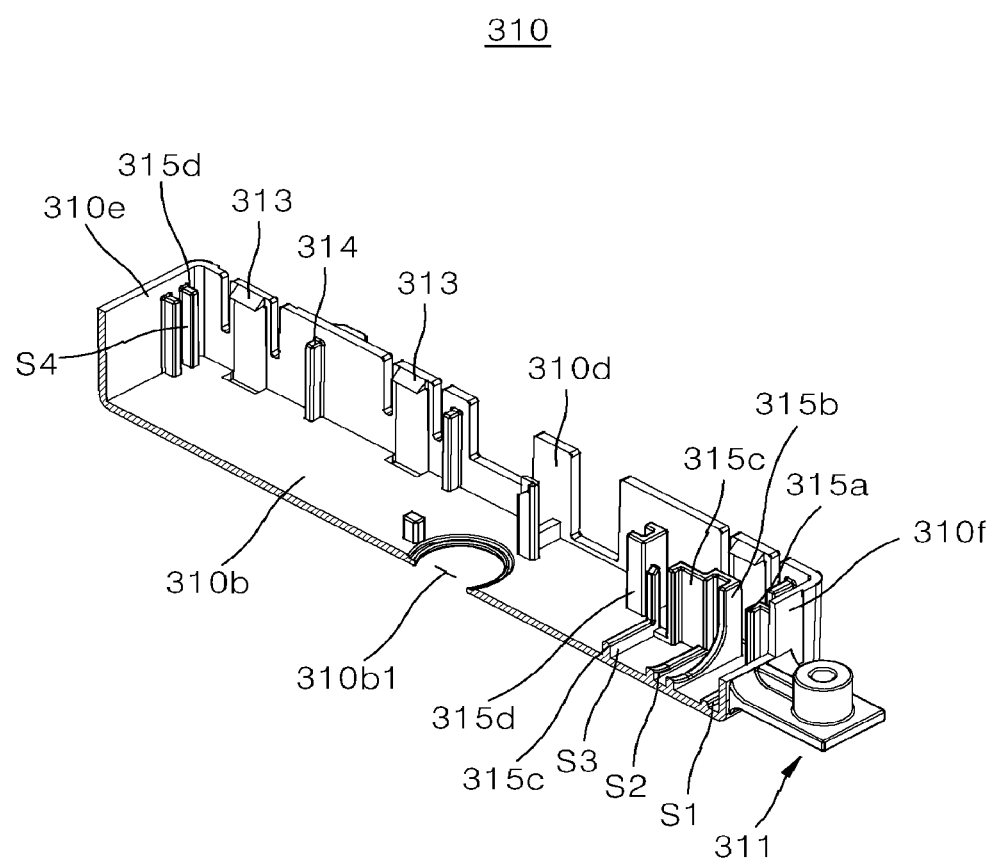
FIG. 13 is a sectional view of FIG. 12.
Figure 14:
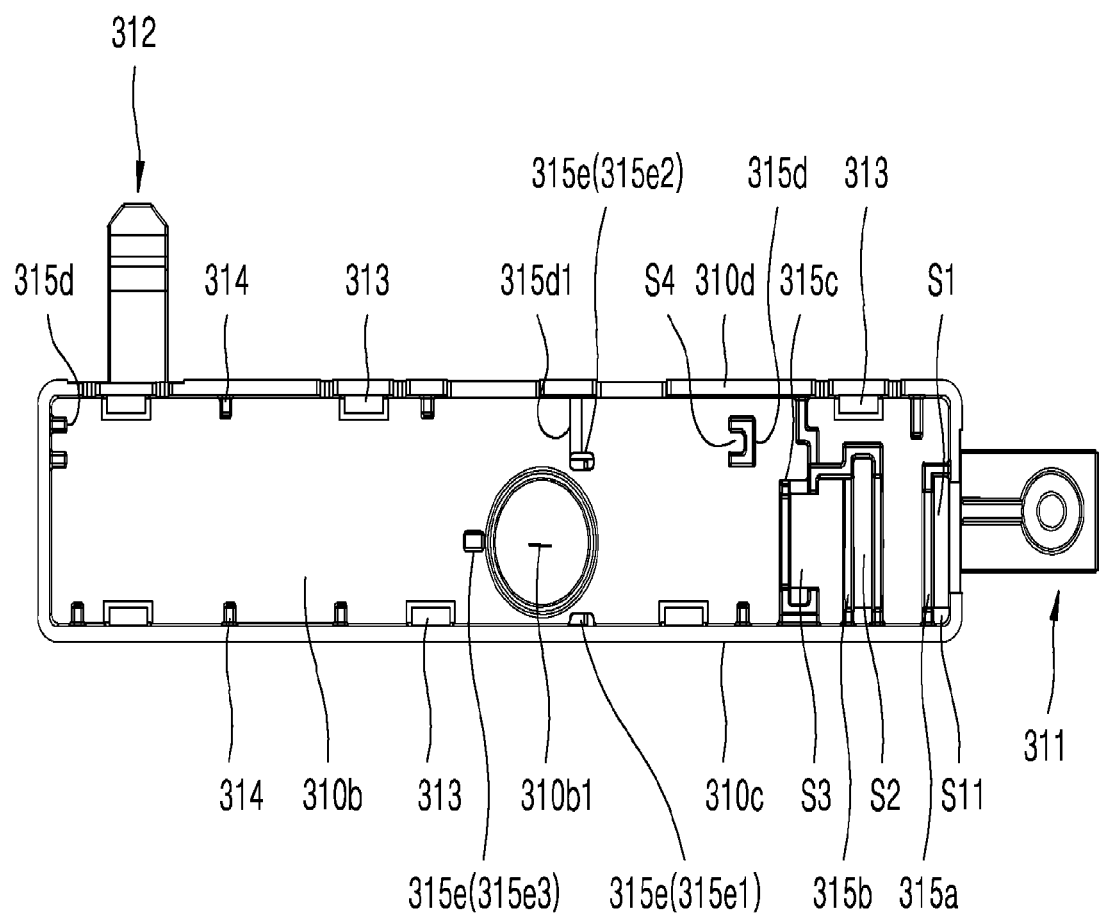
FIG. 14 is a plane view of the holder shown in FIG. 11.

First, referring to FIGS. 12 to 14, the top surface 310a of the holder 310 is entirely open as described above.

Inside the holder 310 with the open top surface 310a, may be fonned the accommodating space in which the left-right direction width is much larger than the vertical direction height and the front-rear direction width.

As described above, the cover 320 may be detachable coupled to the open top surface 310a of the holder 310. When the cover 320 is coupled thereto, the inner accommodating space may be closed.

For the detachable coupling of the cover 320, the plurality of hooking protrusions 313 protruding inward may be integrally formed with an upper end of the front surface 310c and an upper end of the rear surface 310d of the holder 310 with respect to the state where the indicator 300 is disposed in the lower frame 200.

An upper surface of each hooking protrusion 313 may have an inclined surface of which the height gradually decreases as it progresses inward.

Accordingly, as the cover body 321 moves along the inclined surface of the hooking protrusion 313 during the coupling of the cover 320, it may enter the inside of the holder 310 easily.

As described above, when the coupling of the cover 320 is completed, the upper surface of the cover body 321 may be hooked to the lower surface of the hooking protrusion 313.

Meanwhile, a pair of slits with the hooking protrusion 313 interposed therebetween may be formed on the front surface 310c or the rear surface 310d of the holder 310, and on both sides of each hooking protrusion 313. In an embodiment, it is shown that a slit is provided on the rear surface 310d of the holder 310 as one example.

The position of each hooking protrusion 313 may be a free end due to the pair of slits, and the hooking protrusion 313 may be provided with predetermined elasticity when coupling the cover 320.

Meanwhile, the plurality of cover support ribs 314 may be provided at positions spaced apart from the hooking protrusion 313 along the left-right direction on the front surface 310c and the rear surface 310d of the holder 310.

Each of the cover support rib 314 may be formed in a bar shape with approximately uniform thickness and protruding width in the front-rear direction.

The cover support rib 314 disposed on the front surface 310c of the holder 310 may be integrally formed and connected with the lower surface 310b and the front surface 310c of the holder 310.

The cover support rib 314 disposed on the rear surface of the holder 310 may be integrally formed with the lower surface 310b and the rear surface of the holder 310.

The plurality of guide ribs 315 for supporting and fixing the functional modules constituting the indicator 300 may be integrally formed with the inside of the holder 310.

In particular, as described above, the first slot S1 accommodating and supporting the first circuit board 342 of the light source module 340, the second slot S2 accommodating and supporting the first lens 350, the third slot S3 accommodating and supporting the LCD panel 361, and the fourth slot S4 accommodating and supporting the second circuit board 364 may be provided inside the holder 310.

The first slot S1 may be formed by the left lateral surface of the holder 310 and a first guide rib 315a among the plurality of guide ribs 315.

As shown in FIGS. 13 and 14, the first guide rib 315a may be a rib having a barrier shape disposed parallel to the left lateral surface 310f of the holder 310.

A front end of the first guide rib 315a may be integrally connected to the front surface 310c of the holder 310, and a rear end of the first guide rib 315a may be integrally connected to the left lateral surface 310f of the holder 310. In addition, a lower end of the first guide rib 315a may be integrally formed with the lower surface 310c of the holder 310.

Through this process, the first slot S1 for accommodating the first circuit board 342 may be formed between the left lateral surface 310f of the holder 310 and the first guide rib 315a.

At this time, in order to prevent interference with the light source element 341 mounted on the right lateral surface of the first circuit board 342 and other circuit elements, the first guide rib 315a may extend in a U-shape with an open top end.

In addition, in order to prevent interference with the first board connector 343, a U-shaped notch with an open top may be formed on the left lateral surface of the holder 310.

The left-right direction width of the first slot S1 may correspond to the size of the first circuit board 342. For example, it may be equal to or somewhat smaller than the thickness of the first circuit board 342.

Accordingly, the first circuit board 342 may be supported with the front edge and the rear edge thereof partially fitted between the first guide rib 315a and the left lateral surface of the holder 310, and the front-rear direction movement and the left-right direction movement of the first circuit board 342 may be prevented.

As described above, the vertical direction movement of the first circuit board 342 may be blocked by the lower surface 310b of the holder 310 and the cover body 321 of the cover 320.

As it will be described later, means for preventing misassembling of the first circuit board 342 may be provided inside the first slot S1.

The second slot S2 may be disposed on the right side of the first slot S1 in parallel with the first slot S1.

The second slot S2 may be formed by the pair of barrier-shaped second guide ribs 315b parallel with each other while forming a predetermined interval.

Front ends of the pair of the second guide ribs 315b may be integrally formed with the front surface 310c of the holder 310, and rear ends of the second guide ribs 315b may be integrally formed with each other, while being separated from the rear surface 310d of the holder 310. In addition, lower ends of the pair of the second guide ribs 315b may be integrally formed with the lower surface 310b of the holder 310.

Through this, the second slot S2 for accommodating the first lens 350 may be formed between the pair of the second guide ribs 315b arranged parallel to each other.

Through this, the second slot S2 for accommodating the first lens 350 may be formed between the pair of the second guide ribs 315b arranged parallel with each other.

At this time, in order to prevent interference with the visible light beam passing through the first lens 350, upper ends of the pair of the second guide ribs 315b may extend in an open U-shape.

The left-right direction width of the second slot S2 formed between the pair of the second guide ribs 315b may have the size corresponding to the thickness of an outer expanding portion 352 of the first lens 350. For example, the left-right direction width of the second slot S2 may be equal to or somewhat smaller than the thickness of the outer expanding portion 352 of the first lens 350.

Accordingly, the first lens 350 may be supported and the front-rear direction movement and the left-right direction movement of first lens 350 may be prevented, while a front edge and a rear edge of the expanding portion of the first lens 350 is partially fitted between the pair of the second guide ribs 315b.

As described above, the vertical movement of the first lens 350 may be stopped by the lower surface 310b of the holder 310 and the cover body 321 of the cover 320.

As it will be described later, means for preventing the misassembling of the first lens 350 may be provided inside the second slot S2, similar to the first slot SL.

Meanwhile, the third slot S3 may be disposed on the right side of the second slot S2, in parallel.

The third slot S3 may be formed by a pair of third guide ribs 315b arranged on the right side of the second guide rib 315b among the plurality of guide ribs 315.

As shown in FIGS. 13 and 14, the pair of the third guide ribs 315c may be ribs having a barrier shape arranged parallel to each other, while forming a predetermined interval.

Front ends of the pair of the third guide ribs 315 may be integrally formed with the front surface 310c of the holder 310, and rear ends of the pair of guide ribs 315c may be integrally formed with the rear surface 310d of the holder 310, while being separated therefrom.

However, the space between the rear ends of the pair of the third guide ribs 315c may be partially open as shown in FIG. 13 so that the flat cable 363 can pass between the rear ends of the pair of the third guide ribs 315c.

Since the space between the rear ends of the pair of the third guide ribs 315c is partially open, one rib arranged on the left side of the pair of the third guide ribs 315c may be integrally formed with the second guide ribs 315b. Through this, the strength of the third guide ribs 315c may be reinforced.

Lower ends of the pair of the third guide ribs 315c may be integrally formed with the lower end 310b of the holder 310.

Accordingly, the third slot S3 for accommodating the LCD panel 361 and the shielding plate 362 may be formed between the pair of the third guide ribs 315c arranged parallel to each other.

At this time, in order to prevent interference with the visible light beam passing through the LCD panel 361, upper ends of the pair of the third guide ribs 315c may extend in an open U-shape.

The left-right direction width of the third slot S3 formed between the pair of the third guide ribs 315c may correspond to the thickness of the LCD panel 361 and the thickness of the shielding plate 362, preferably, equal to or somewhat smaller than the thickness of the LCD panel 361 and the thickness of the shielding plate 362. In addition, the shape of the third slot S3 may be formed to have a shape corresponding to the exterior designs of the LCD panel 361 and the shielding plate 362.

Accordingly, in a state where the front edges and the rear edges of the LCD panel 361 and the shielding plate 362 are partially fitted between the pair of the third guide ribs 315c, the LCD panel 361 and the shielding plate 362 may be supported and the front-rear direction movement and left-right direction movement of them may be prevented.

As described above, the up-down direction movement of the LCD panel 361 and the shielding plate 362 may be stopped by the lower surface 310b of the holder 310 and the cover body 321 of the cover 320.

Meanwhile, unlike the first through third slots S1, S2 and S3 mentioned above, the fourth slot S4 may extend along the longitudinal direction of the holder 310, that is, the left-right direction (e.g., Le-Ri direction).

The fourth slot S4 may be formed by the pair of the fourth guide ribs 315d spaced apart along the longitudinal direction of the holder 310 among the plurality of guide ribs 315.

To this end, the fourth slot S4 may have the directivity extending along the longitudinal direction of the holder 310. For example, the fourth slot S4 may be disposed parallel to the rear surface 310d of the holder 310, adjacent to the rear surface 310d of the holder 310.

The fourth slot S4 may be formed by the pair of the fourth guide ribs spaced apart along the longitudinal direction of the holder 310 among the plurality of the guide ribs 315.

Right edges and left edges of the second circuit board 364 having the rectangular shape may be slidingly inserted into the pair of the fourth guide ribs 315d, and may prevent the movement of the second circuit board 364 after the coupling.

For that purpose, as shown in FIGS. 13 and 14, the left one of the pair of the fourth guide ribs 315d may protrude from the lower surface 310b of the holder 310 and may be a rib having a bar-shape with a ⊂-shape cross sectional area. The ⊂-shaped space may be formed inside the single bar-shaped rib and the left edge of the first circuit board 342 may be accommodated in the ∈-shaped space.

In addition, the right one of the pair of the fourth guide ribs 315b may protrude from the right lateral surface 310b of the holder 310 with a uniform protruding height, and may be a pair of bar-shaped ribs integrally connected to the lower surface 310a of the holder 310. A ⊂-shape space may be formed between the right lateral surface 310e of the holder and the pair of the bar-shaped ribs. The right edge of the first circuit board 342 may be accommodated in the ⊏-shaped space.

The front-rear direction width of the ⊏-shaped space provided in the pair of the fourth guide ribs 315d may be equal to or somewhat smaller than the thickness of the second circuit board 364.

Through this, the fourth slot S4 for accommodating the second circuit board 364 may be formed between the pair of the fourth guide ribs 315d.

Accordingly, in a state where the right edge and the left edge of the second circuit board 364 are partially fitted between the pair of the fourth guide ribs 315d, the second circuit board 364 may be supported and the front-rear direction movement and left-right direction movement thereof may be prevented.

As described above, the up-down direction movement of the second circuit board 364 may be stopped by the lower surface 310b of the holder 310 and the cover body 321 of the cover 320.

As it will be described later, means for preventing the misassembling of the second circuit board 364 may be provided inside the fourth slot S4.

Meanwhile, the plurality of guide ribs 315 may include a fifth guide rib 315e provided as means for supporting the second lens 380 and the reflector 370 and preventing separation.

The first circuit board 342, the first lens 350, the LCD panel 361 and the second circuit board 364 described above may be inserted and coupled into the first through fourth slots S1, S2, S3 and S4 in the manner of sliding movement.

Similar to this, the second lens 380 among the other functional modules may be also inserted and coupled into the holder 310 in the manner of sliding movement.

However, the slot for the sliding movement may be provided in the second lens 380 as a notch slot, which will be described later.

The fifth guide rib 315e among the plurality of guide ribs 315 may be coupled to the notch slot provided in the second lens 380 to guide the sliding movement when the second lens 380 is inserted.

As shown in the embodiment, the fifth guide ribs 315e as one example, may include a first stopper rib 315e1, a second stopper rib 315e2 and a third stopper rib 315e3 that are arranged adjacent to the first light transmission hole 310b1, with being separated from each other.

The first stopper rib 315e1 and the second stopper rib 315e2 may be spaced apart from each other along the front-rear direction, and may be bar-shaped ribs protruding upward (e.g., U-direction).

The first stopper rib 315e1 may be integrally connected to the front surface 310c and the lower surface 310b of the holder 310.

The second stopper rib 315e2 may be disposed at a position spaced apart from the rear surface 310d of the holder forward, and may be integrally formed with the lower surface 310b of the holder 310. A protruding rib 315d1 having a wall shape protruding upward (e.g., U-direction) from the lower surface 310b of the holder 310 may be disposed between the second stopper rib 315e2 and the rear surface 310d of the holder 310. The strength of the second stopper rib 315e2 may be reinforced through the protruding rib 315dl.

The protruding rib 315dl may further perform a function of preventing the misassembling of the second circuit board.

A first support surface 315e11 and a second support surface 315e21, which are inclined surfaces with a gradient gradually decreasing in height from left to right, may be provided at upper ends of the first stopper rib 315e1 and the second stopper rib 315e2, respectively.

In a state of being inclined with a predetermined inclination angle with respect to the vertical direction, the first support surface 315e11 and the second support surface 315e21 may support the reflector 370.

Accordingly, the inclination gradient of the first support surface 315e11 and the second support surface 315e21 may be equal to the inclination angle of the reflector 370.

A third stopper rib 315e3 may be disposed to the right with respect to the first stopper rib 315e1 and the second stopper rib 315e2 with the first light transmission hole 310b1 interposed therebetween.

The third stopper rib 315e3 may be a bar-shaped rib protruding upward (e.g., U-direction) from the lower surface 310b of the holder 310, similar to the first stopper rib 315e1 and the second stopper rib 315e2.

However, the protruding height of the third stopper rib 315e3 may be lower than that of the first stopper rib 315e1 and that of the second stopper rib 315e2.

The first stopper rib 315e1, the second stopper rib 315e2 and the third stopper rib 315e3 may serve to guide the sliding movement of the second lens 380, when coupling the second lens 3840.

The first stopper rib 315e1, the second stopper rib 315e2 and the third stopper rib 315e3 may be coupled to a first notch slot 3821a, a second notch slot 3821b and a third notch slot 3821c that are provided in the second lens 380, respectively.

In order to guide the smooth sliding movement, the first stopper rib 315e1, the second stopper rib 315e2 and the third stopper rib 315e3 may have a shape with a cross sectional area gradually increasing as progressing.

As described above, the supporting and fixing structure for the functional modules constituting the indicator 300 may be integrally formed inside the holder 310.

In addition, a detachable fastening structure for the cover 320 may be integrally formed in the holder 310.

A first connection tab 311 and a second connection tab 312 may be integrally formed in the holder 310 as the structure for fixing and installing the indicator 300 itsel.

Through this, the manufacturing costs of the holder 310 may be remarkably reduced and the number of the components for constituting the indicator may be minimized.

Hereinafter, referring to FIGS. 15 to 26, the process of installing and assembling the functional modules constituting the indicator 300 will be described. However, the installation order of the functional modules which will be described herewith is only illustrative, and an assembly process with the order of precedence reversed is also applicable.

Figure 15:
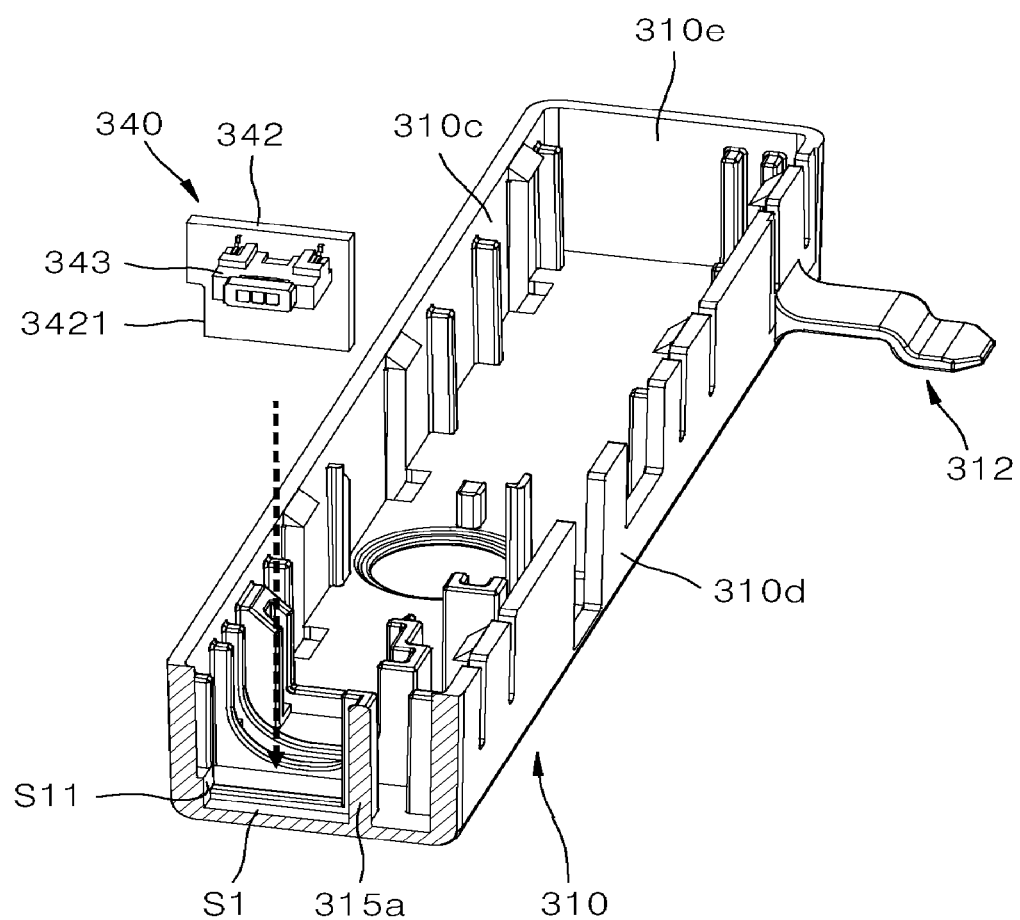
FIG. 15 is a sectional view of a holder cut-away along a front-rear direction to describe a process of coupling a first lens to the holder.

First as shown in FIG. 15, the first circuit board 342, on which the circuit element including the light source element 341 and the first board connector 343 are mounted, may be inserted into the first slot S1.

As shown in the drawings, one lateral surface of the first circuit board 342 on which the light source element is mounted may be oriented toward the right lateral surface of the holder 310, and the other side on which the first board connector 343 is mounted may be oriented toward the left lateral surface of the holder 310. In this state, the first circuit board 342 may be inserted into the first slot S1 and slidingly moved.

Accordingly, the illustrated arrangement state may be a state in which the light source module 340 is normally assembled in the first slot S1.

However, since the first circuit board 342 as a plate shape with generally uniform thickness, there is a possibility that the first circuit board 342 could be assembled with its front and back sides being turned over or its top and bottom being turned upside down.

As means for preventing such misassembling, a first step portion S11 protruding upward (e.g., U-direction) from the lower surface 310b of the holder 310 may be provided in the first slot S1. As shown in the embodiment, the first step portion S11 may be disposed adjacent to or integrally connected the front surface 310c of the holder 310 as one example.

Through the first step portion S11, the front-rear direction width of the lower end of the first slot S1 may be much smaller than the front-rear direction width of the upper end of the first slot S1.

Correspondingly, a cutting portion 3421 having a shape corresponding to the shape of the first step portion S11 may be provided at the front edge of the first circuit board 342.

Through the cutting portion 3421, the front-rear direction width of the lower edge of the first circuit board 342 may be formed smaller than the front-rear direction width of the upper edge of the first circuit board 342.

By this first step portion S11 and the cutting portion 3421, it may be effectively prevented that the first circuit board 342 is assembled in the first slot S1 with the front and back sides of the first circuit board 342 or the upside-down direction being turned over.

Figure 16:
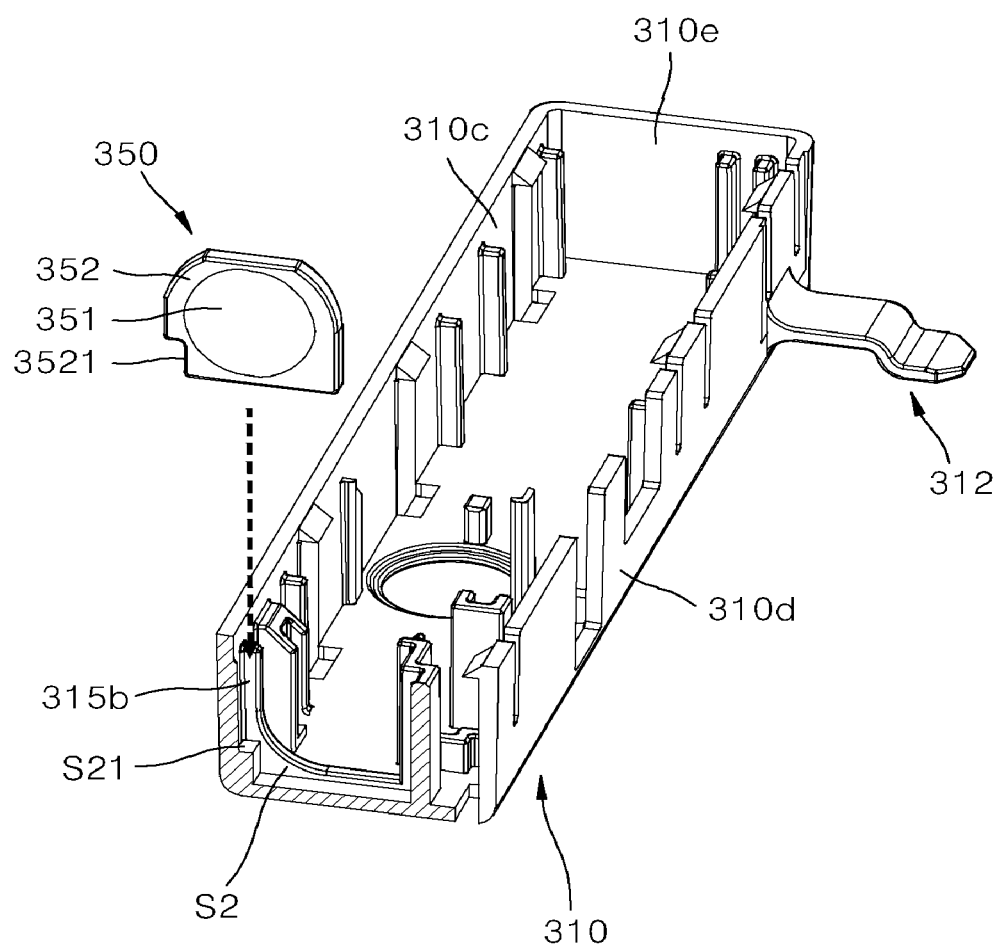
FIG. 16 is a sectional view of a holder cut-away along a front-rear direction to describe a process of coupling a first lens to the holder.

Next, as shown in FIG. 16, the first lens 350 may be inserted in the second slot S2.

As shown in the drawing, in a state where the right lateral surface, on which the refracting portion forming the convex lens is provided, is oriented toward the right lateral surface 310e of the holder 310, the first lens 350 may be inserted into the second slot S2 to be slidingly moved.

Accordingly, the illustrated arrangement state may be a state where the first lens 350 is normally assembled to the second slot S2.

However, since the expanding portion 352 forming the outer edge surface of the refracting portion 351 has a plate shape with the generally uniform front-rear direction thickness, there could be a possibility that the front and back sides of the first lens 350 are turned over or assembled in the upside-down state.

As means for preventing the misassembling, a second step portion S21 protruding upward from the lower surface 310b of the holder 310 may be provided inside the second slot S2, similar to the first slot S1.

As shown in the embodiment, the second step portion S21 may be adjacent to or integrally connected with the front surface 310c of the holder.

Through the second step portion S21, the front-rear direction width of the lower end of the second slot S2 may be much smaller than the front-rear direction width of the upper end of the second slot S2.

Correspondingly, a cutting portion 3521 having a shape corresponding to the shape of the second step portion S21 may be provided at the front edge of the expanding portion 352 of the first lens 350.

Through the cutting portion 3521, the front-rear direction width of the lower edge of the first lens 350 342 may be formed smaller than the front-rear direction width of the upper edge of the first circuit board 342.

By this second step portion S21 and the cutting portion 3521, it may be effectively prevented that the first lens 350 is assembled to the second slot S2, with the front and back sides of the first lens 350 or the upside-down being turned over.

Figure 17:
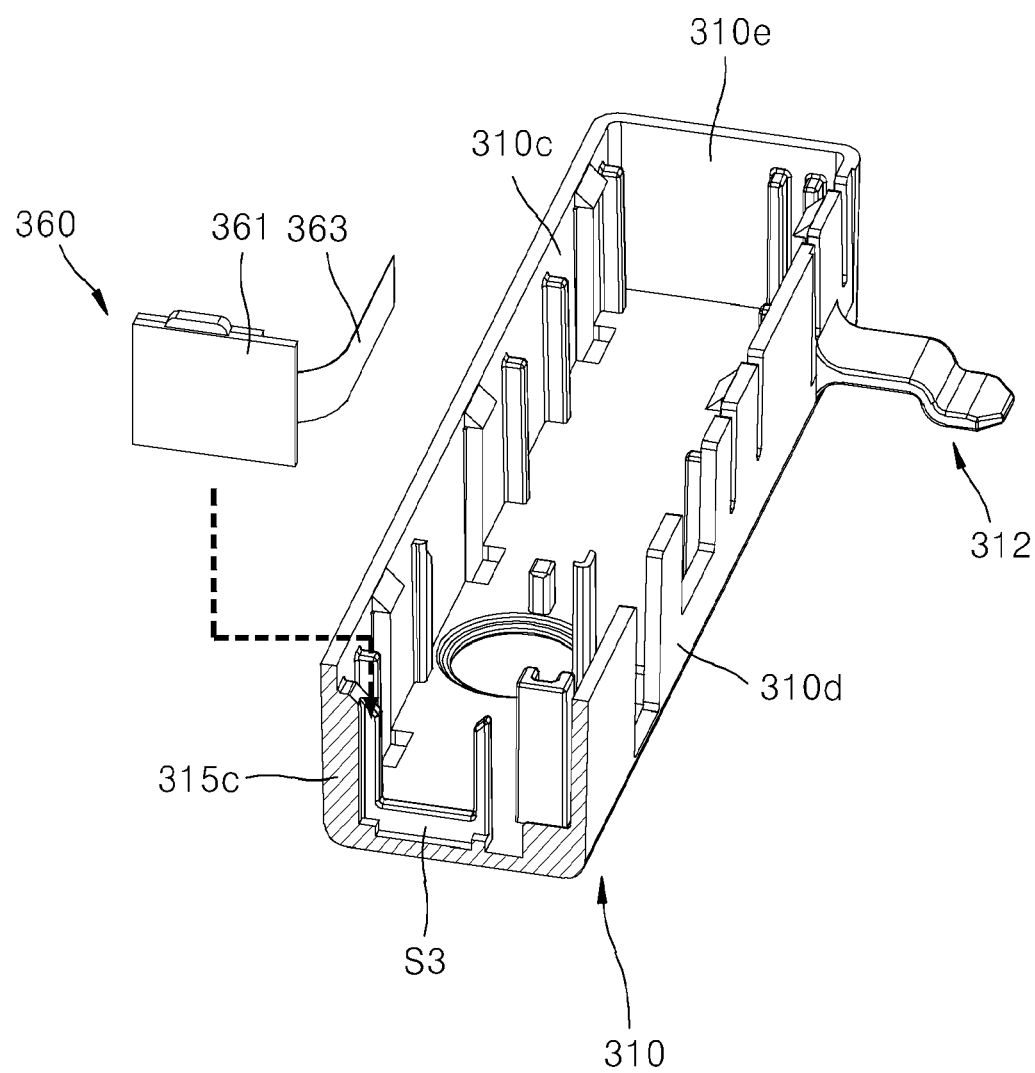
FIG. 17 is a sectional view of the holder cut-away along a front-rear direction to describe a process of coupling a LCD panel among LCD modules to the holder.

Next, as shown in FIG. 17, the LCD panel 361 to which the shielding plate 362 and the flat cable 363 are attached may be inserted in the third slot S3 and slidingly moved.

As shown in the drawing, in a state where the shielding plate 362 is directed toward the right lateral surface 310e of the holder 310 and the flat cable 363 is disposed behind the holder, the LCD panel 361 may be inserted into the third slot S3 to be slidingly moved.

Accordingly, the illustrated arrangement state may be a state where the LCD panel 361 is normally assembled to the third slot S3.

As shown in the drawing, in a state where the shielding plate 362 and the flat cable 363 are attached, the assembly of the LCD panel 361, the shielding plate 362 and the flat cable 363 may have an asymmetric shape.

As described above, since it has the asymmetrical shape corresponding to the exterior design of the assembly configured of the LCD panel 361, the shielding plate 362 and the flat cable 363, the third slot S3 may have an effect of preventing the misassembling by itself.

Meanwhile, as shown in the drawing, one end of the flat cable 363 may be connected to the rear edge of the LCD panel 361. As described above, when the LCD panel 361 is inserted and coupled into the third slot S3, the other end of the flat cable 363 may pass between the rear ends of the pair of the third guide ribs 315c to be connected and linked to the LCD panel connector 366 of the second circuit board 364.

Figure 18:
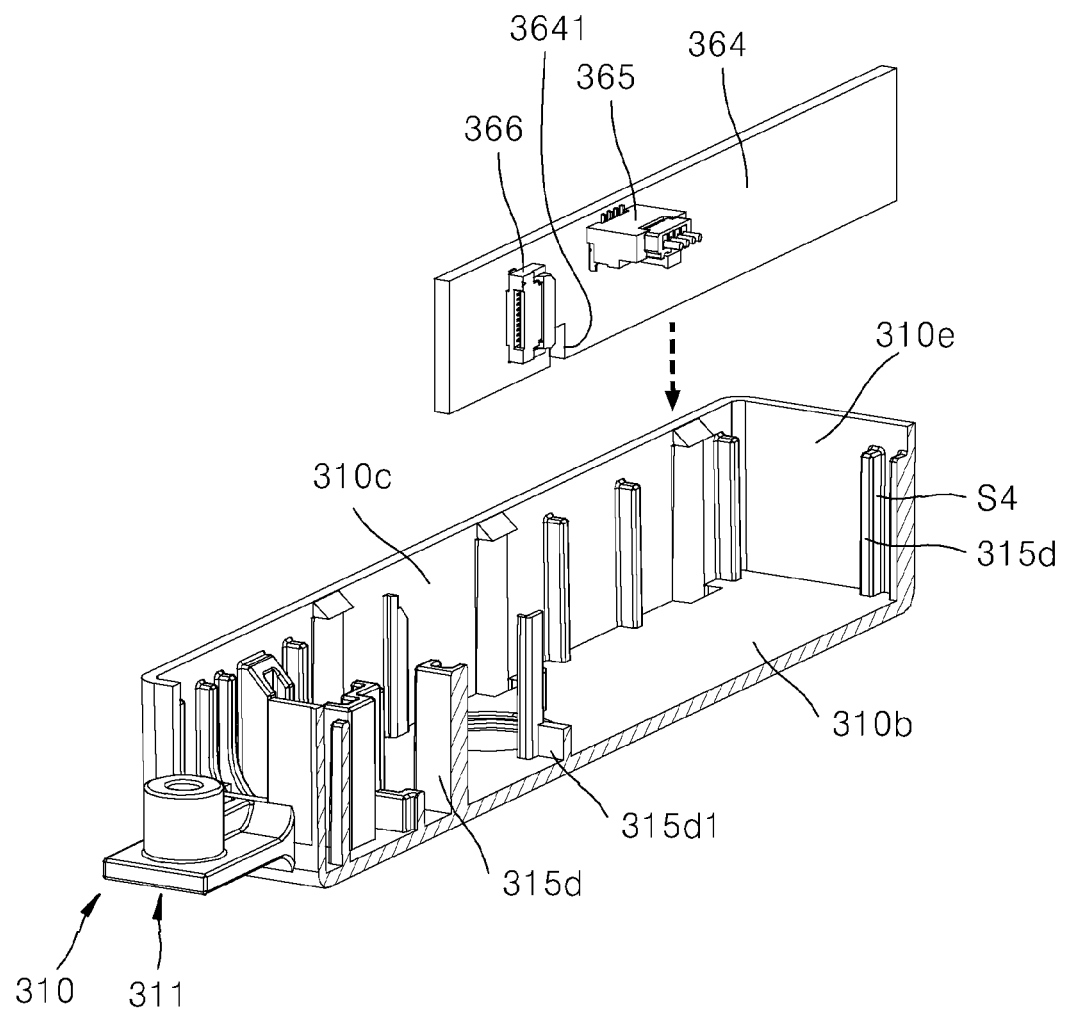
FIG. 18 is a sectional view of a holder cut-away along a front-rear direction to describe a process of coupling a second circuit board among LCD modules to the holder.
Figure 19:
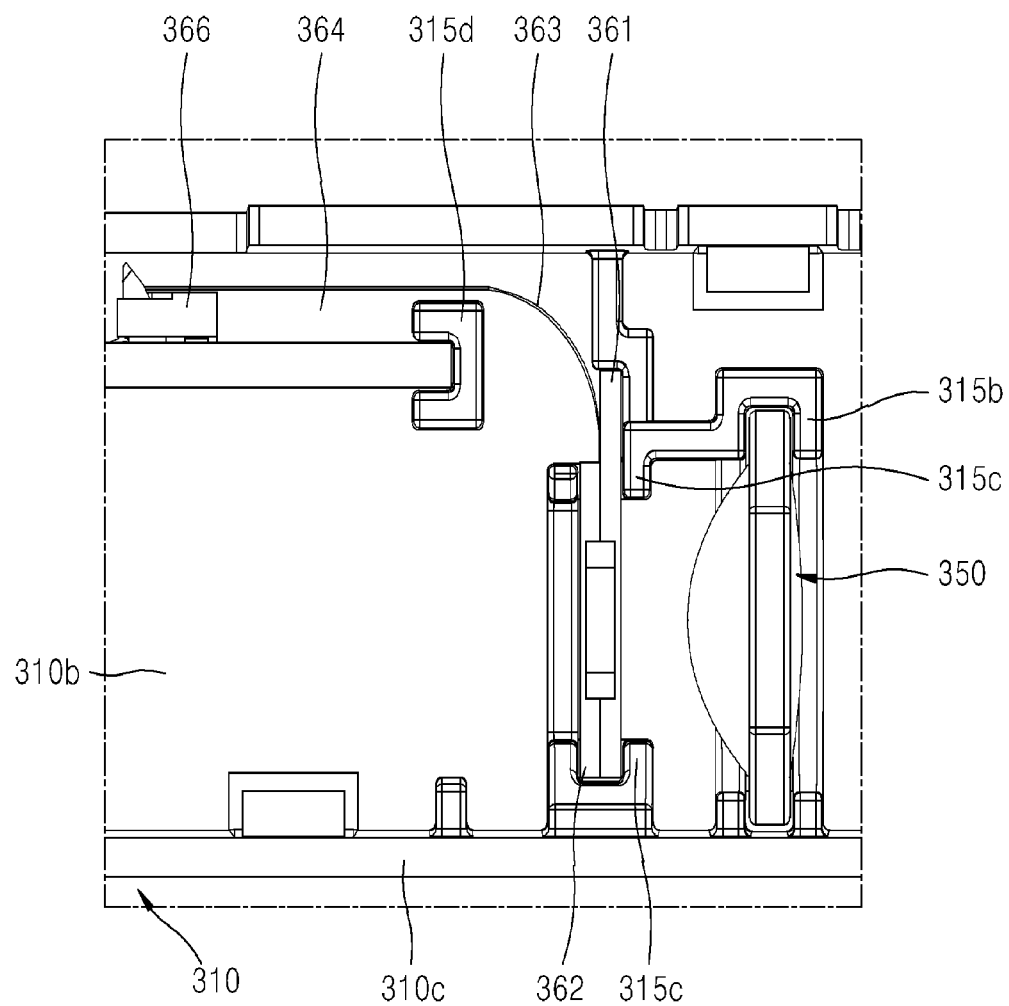
FIG. 19 is a plane view showing a state where a first lens, a LCD panel and a second circuit board are coupled to the holder.

Next, as shown in FIG. 18, the second circuit board 364 may be inserted in the fourth slot S4.

As shown in the drawing, in a state where one lateral surface on which the second board connector 365 and the LCD panel connector 366 are mounted toward the rear surface 310d of the holder 310, the second circuit board 364 may be inserted into the fourth slot S4 to be slidingly moved.

Accordingly, the illustrated arrangement state may be a state where the second circuit board 364 is normally assembled to the fourth slot S4.

However, since the second circuit board 364 has a plate shape with the generally uniform front-rear direction thickness, there could be a possibility that the second circuit board is assembled with the front and back sides or the upside-down being turned over.

As means for preventing the misassembling, a protruding rib 315d1 protruding upward from the lower surface 310b of the holder 310 may be provided, similar to the first slot S1.

As shown in the embodiment, as described above, the protruding rib 315dl may be disposed between the rear surface 310d of the holder and the second stopper rib 315e2 and integrally formed with them.

However, the protruding height of the protruding rib 315dl from the lower surface 310b of the holder 310 may be much smaller than the length of the short side of the second circuit board 364.

Correspondingly, a board notch 3641 having a shape corresponding to the shape of the protruding rib 314dl may be provided at the lower edge of the second circuit board 364.

The protruding rib 315d 1 and the board notch 3641 described above may be formed at positions that are asymmetrical with respect to the center of the second circuit board 364.

By the protruding rib 315*dl* and the board notch 3641, it may be effectively prevented that the second circuit board 364 is assembled to the fourth slot S4, with the front and back sides or the upside-down being turned over.

Figure 20:
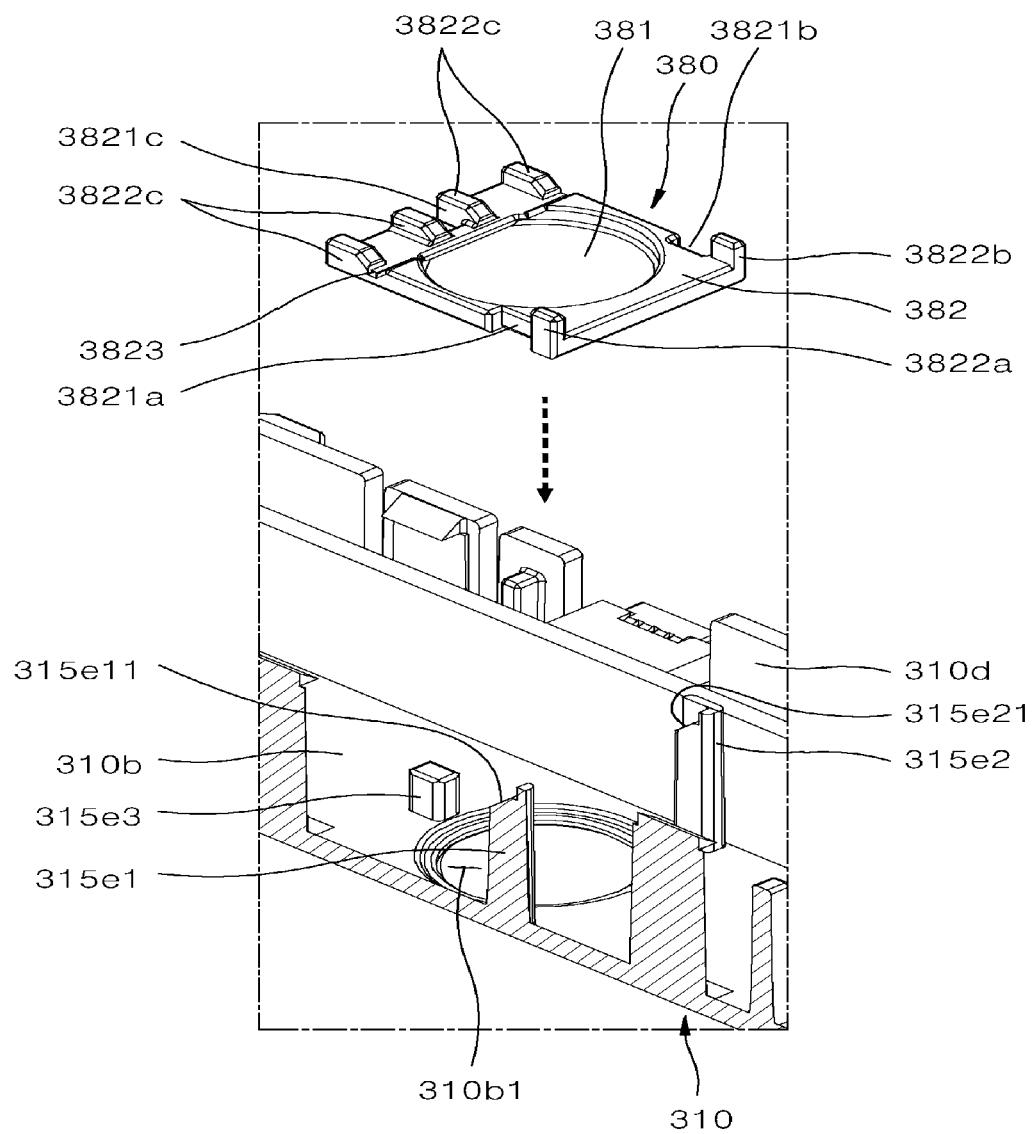
FIG. 20 is a sectional view of a holder cut-away along a left-right direction to describe a process of coupling a second lens to the holder.
Figure 21:
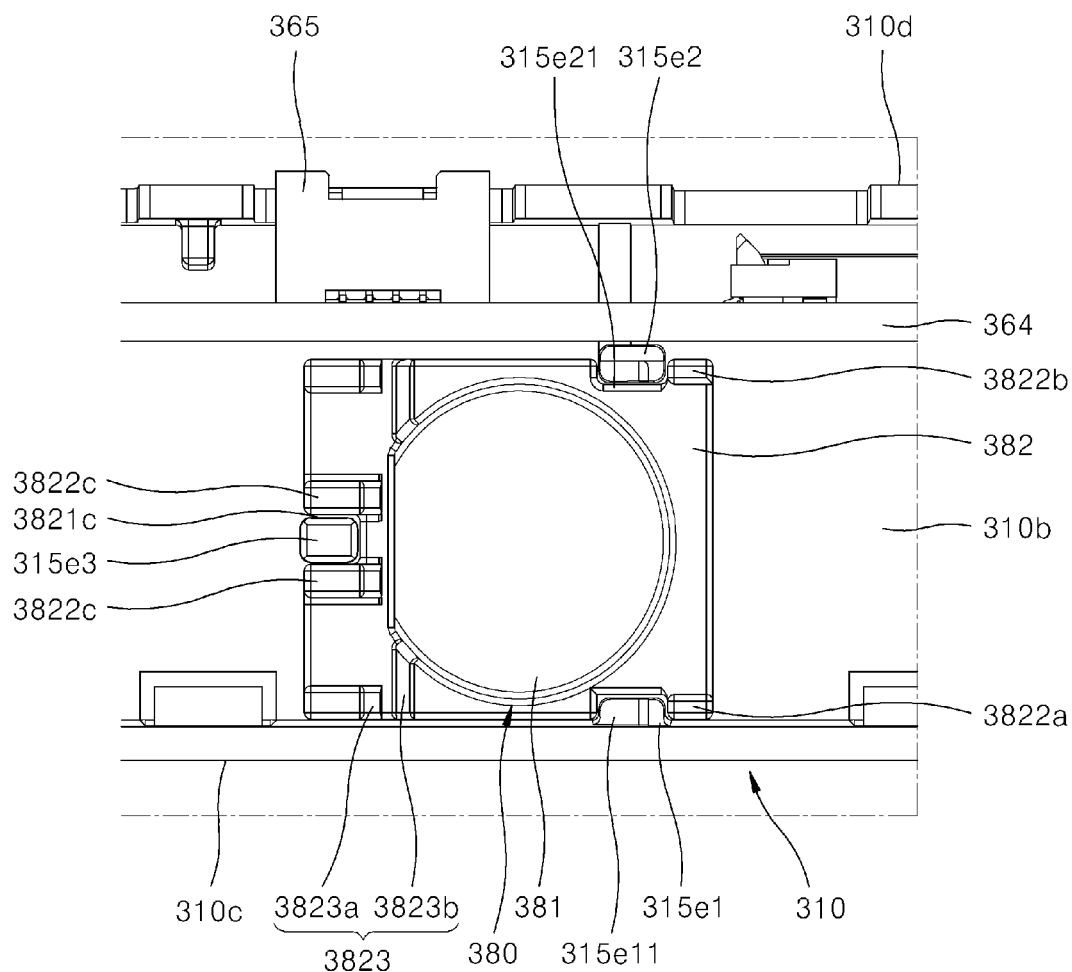
FIG. 21 is a plane view showing a state where a second lens is coupled to the holder.

Next, as shown in FIGS. 20 and 21, the second lens 380 may be assembled to the lower surface 310*d* of the holder 310, as being moved toward the lower surface.

As shown in the drawing, in a state where the lower surface on which the refracting portion forming the convex lens is provided, is oriented toward the lower surface 310*b* of the holder 310, the second lens is moving downward (e.g., D-direction) to be assembled.

Accordingly, the illustrated arrangement state may be a state where the second lens 380 is normally assembled to the lower surface 310*b* of the holder 310.

At this time, as mentioned above, the downward sliding movement of the second lens 380 may be guided by the first stopper rib 315*e*1, the second stopper rib and the third stopper rib 315*e*3.

As shown in the drawing, the first notch slot 3821*a* in which the first stopper rib 315*e*1 is inserted and coupled, the second notch slot 3821*b* in which the second stopper rib 315*e*2 is inserted and coupled, and a third notch slot 3821*c* in which the third stopper rib 315*e*3 is inserted and coupled.

The first through third notch slots 3821*a*, 3821*b* and 3821*c* may be formed at positions corresponding to the first stopper rib 315*e*1, the second stopper 315*e*2 and the third stopper rib 315*e*3.

More specifically, the first notch slot 3821*a* may be disposed at the front edge of the first lens 350, adjacent to the left edge. The second notch slot 3821*b* may be formed at the rear edge of the first lens 350, adjacent to the left edge.

In addition, the third notch slot 3821*c* may be formed at the rear edge of the second lens 380, specifically, at a position in an intermediate area of the rear edge.

Since the expanding portion 382 forming the outer circumferential surface of the retracting portion 381 has a plate shape having the vertical thickness that is generally uniform, there is a possibility that the second lens 380 is assembled, with the top and back sides being turned over.

As means for preventing the misassembling, a plurality of protrusions 3822*a*, 3833*b* and 3822*c* protruding upward (e.g., li-direction) are integrally formed on the upper surface of the expanding portion 382 of the second lens 380.

More specifically, the plurality of protrusions 3822*a*, 3822*b* and 3822*c* may include a first protrusion 3822*a* formed between the first notch slot 3821*a* and the left edge of the expanding portion 382; a second protrusion 3822*b* formed between the second notch slot 3821*b* and the left edge of the expanding portion 382; and a third protrusion 3822*c* extending from the right edge to the refracting portion 381.

As described above, since the plurality of protrusions 3822*a*, 3822*b* and 3822*c* are integrally formed with the upper surface of the expanding portion 382, a predetermined space may be formed between the refracting portion 381 and the lower surface 310*b* of the holder 310 if the second lens 380 is misassembled with its upper and lower sides turned upside down.

Due to the space, it can be intuitively confirmed that the second lens 380 is misassembled.

Meanwhile, the first protrusion 3822*a* may be disposed adjacent to the left side of the first notch slot 3821*a*, and one lateral surface of the first protrusion 3822*a* may expand the height of the first notch slot 3821*a*.

Similarly, the second protrusion 3822*b* may be disposed adjacent to the left side of the second notch slot 3821*b*, and one lateral surface of the second protrusion 3822*b* may expand the height of the second notch slot 3821*b*.

Since the heights of the first notch slot 3821*a* and the second notch slot 3821*b* are expanded by the first protrusion 3822*a* and the second protrusion 3822*b* as described above, the contact areas with the first stopper rib 315*e*1 and the second stopper rib 315*e*2 may be expanded. Through this, the left edge of the second lens 380 may be supported more stable.

In addition, among the third protrusions 3822*c*, two ones arranged on the inside may be adjacent to the third notch slot 3821*c*, and they may expand the height of the third notch slot 3821*c*.

Since the height of the third notch slot 3821*c* is expanded by the third protrusion 3822*c*, the contact area with the third stopper rib 315*e*3 may be expanded. Through this, the right edge of the second lens 380 may be supported more stably.

Figure 22:
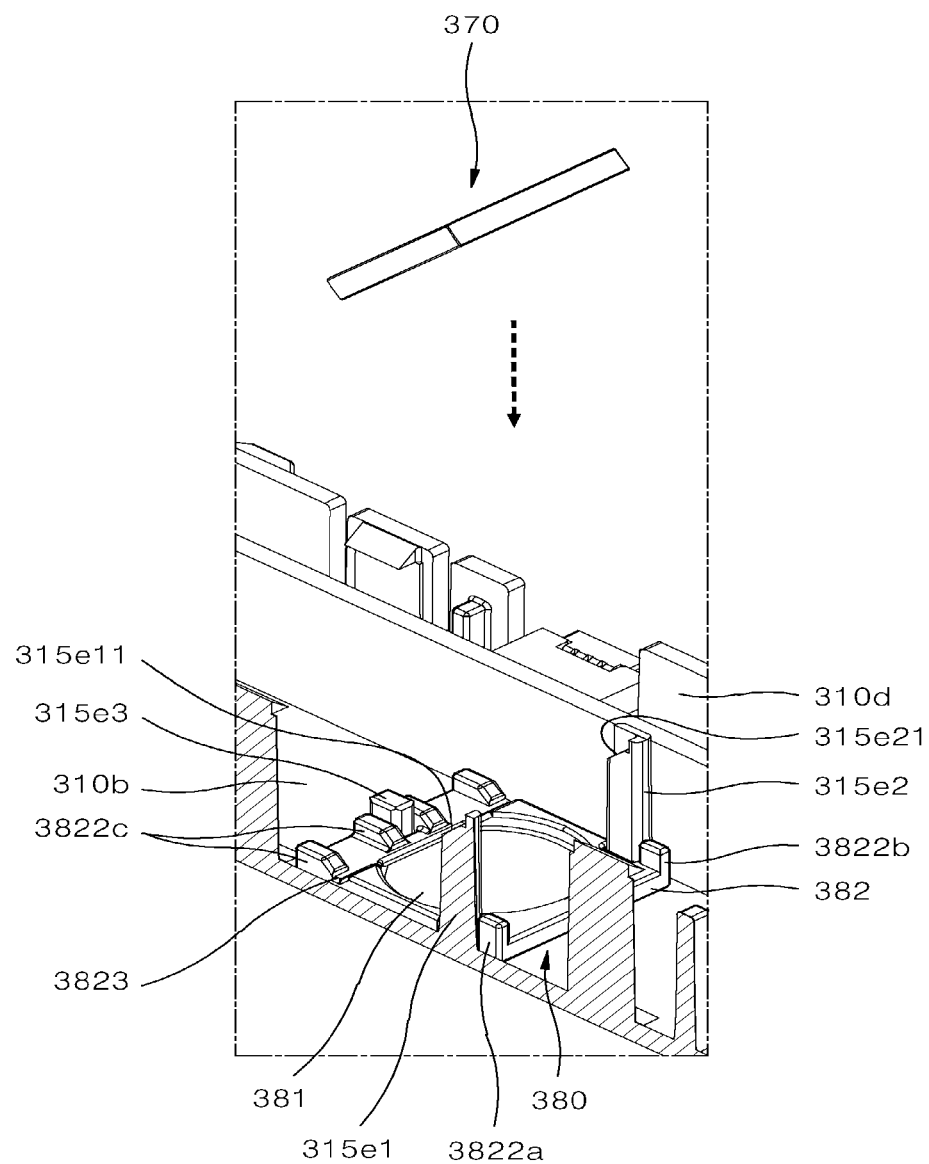
FIG. 22 is a sectional view of a holder cut-away along a left-right direction to describe a process of coupling a reflector to a holder to which a second lens is coupled.

When the arrangement and assembly of the second lens 380 is completed as shown in FIG. 2L the reflector 370 may be disposed and assembled as shown in FIG. 22.

The reflector 370 described above may be disposed and supported in an inclined state with approximately a predetermined inclination angle with respect to the vertical direction so as to change the traveling path of the visible light beam to the vertical direction.

The upper end of the reflector 370 described above may be supported by and be in contact with the first support surface 315*e*11 and the second support surface 315*e*21 provided at the upper end of first stopper rib 315*e*1 and the upper end of the second stopper rib 315*e*2 as the inclined surfaces.

Meanwhile, the lower end of the reflector 370 may be supported by the second lens 380.

For that purpose, a locking groove 3823 may be recessed downward from the upper surface of the expanding portion 382 of the second lens 380.

The locking groove 3823 may have a shape corresponding to the shape of the lower end of the reflector 370.

When the reflector 370 has the simple plate shape as described in the embodiment, the locking groove 3823 may be formed to have an L-shape in a cross-section area cut along a plane perpendicular to the front-rear direction, corresponding to the shape of the lower end of the reflector 370.

At this time, the L-shaped surface 3823*a* may be formed by cutting a right end of the third protrusion 3822*c* into an inclined surface shape, based on the illustrated embodiment, the L-shaped surface 3823*a* may be an inclined surface with an inclination gradient in which the vertical position increases as progressing toward the third stopper rib 315*e*3.

When the plurality of third protrusions 3822*c* are spaced apart from each other as shown in the embodiment, the L-shaped surface may be provided on a right end of each third protrusion 3822*c* as the inclined surface. Through this, the L-shaped surface 3823*a* may form a discontinuous surface.

Figure 23:
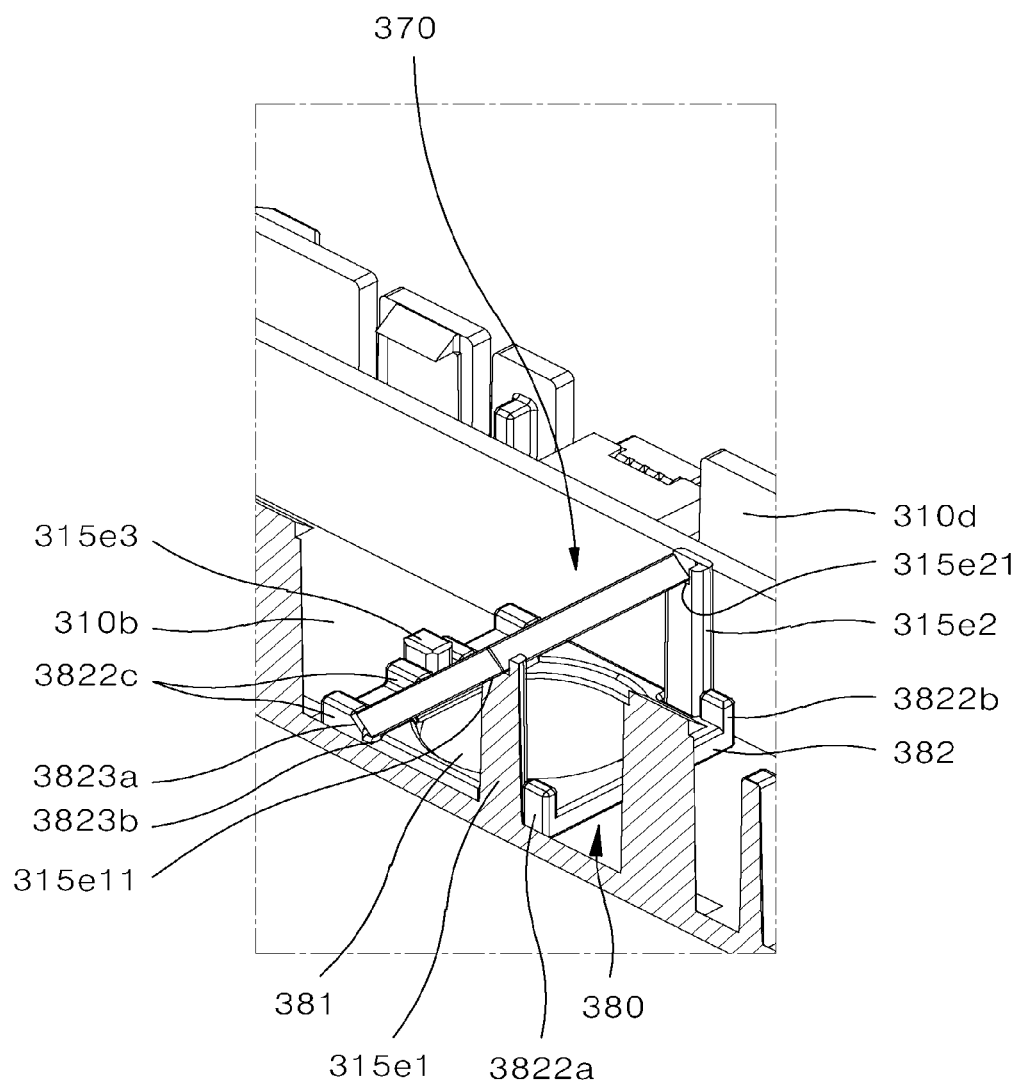
FIG. 23 is a sectional view to describe a state where the coupling of the reflector is completed in the state shown in FIG. 22.

Accordingly, as shown in FIG. 23, when the arrangement of the reflector 370 is completed, the left one among the four edges of the reflector 370 based on the illustrated state may be in surface contact with the L-shaped surface 3823*a*, and the left edge of the reflector 370 may be supported by the L-shaped surface 3823*a*.

The other L-shaped surface 3823*b* may be formed by cutting the expanding portion between the third protrusion 3822*c* and the refracting portion 381 into the inclined surface.

Accordingly, the other L-shaped surface 3823b shown in the embodiment may be the inclined surface with an inclination gradient that is approximately equal to the inclination angle of the reflector 370 so as to support the lower surface of the reflector 370. That is, based on the illustrated embodiment, the other L-shaped surface 3823b may be the inclined surface having an inclination gradient in which the vertical position rises toward the first stopper rib 315e1 and the second stopper rib 315e2.

Figure 24:
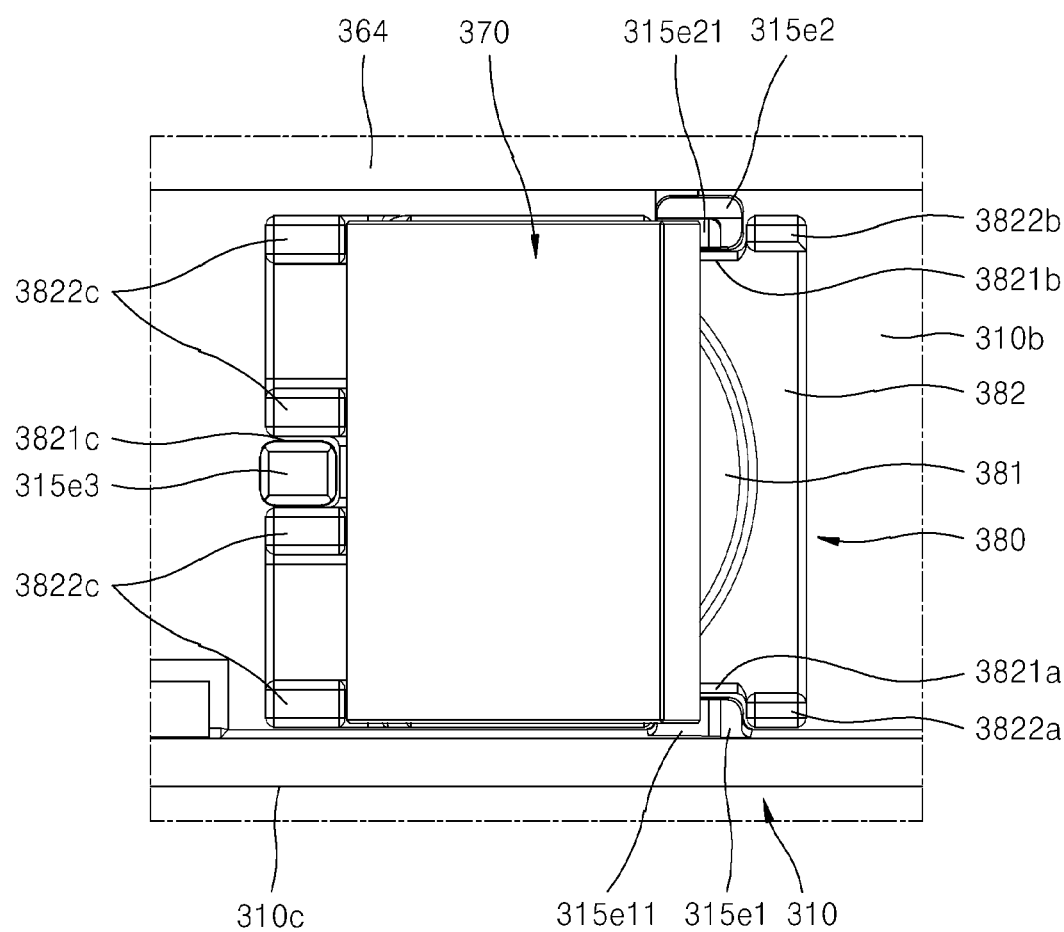
FIG. 24 is a plane view of FIG. 23.

As shown in FIG. 23, when the arrangement of the reflector 370 is completed, the lower surface of the reflector 370 based on the illustrated state may be in surface contact with the other L-shaped surface 3823b, and the lower surface of the reflector 370 may be supported by the other L-shaped surface 3823b. FIGS. 23 to 25 show the state where the arrangement and assembly of the reflector 370 and the second lens 380 is completed.

First, when the arrangement of the second lens 380 on the lower surface 310b of the holder 310, a surface contact relationship may be formed between the lower surface of the expanding portion 382 of the second lens 380 and the lower surface 310b of the holder 310.

Through this, the contact area between the second lens 380 and the lower surface 310b of the holder 310 may be expanded, and the second lens 380 may be stably supported by the lower surface 310b of the holder 310.

Meanwhile, as described above, front-rear direction movement and left-right direction movement of the second lens 380 may restricted by inserting the first through third stopper ribs 315e1, 315e2 and 315e3 into the first through third notch slots 3821a, 3821b and 3821c, respectively.

However, there is a possibility that gap might occur due to tolerances between the first to third notch slots 3821a, 3821b and 3821c and the first to third stopper ribs 315e1, 315e2 and 315e3. Due to this gap, the position for disposing the second lens 380 might not be accurately guided.

Accordingly, means for accurately guiding the arrangement position of the second lens 380 due to the gap may be provided in the refracting portion 381 of the second lens 380 and the second light transmission hole 310b1 of the holder 310.

Figure 25:
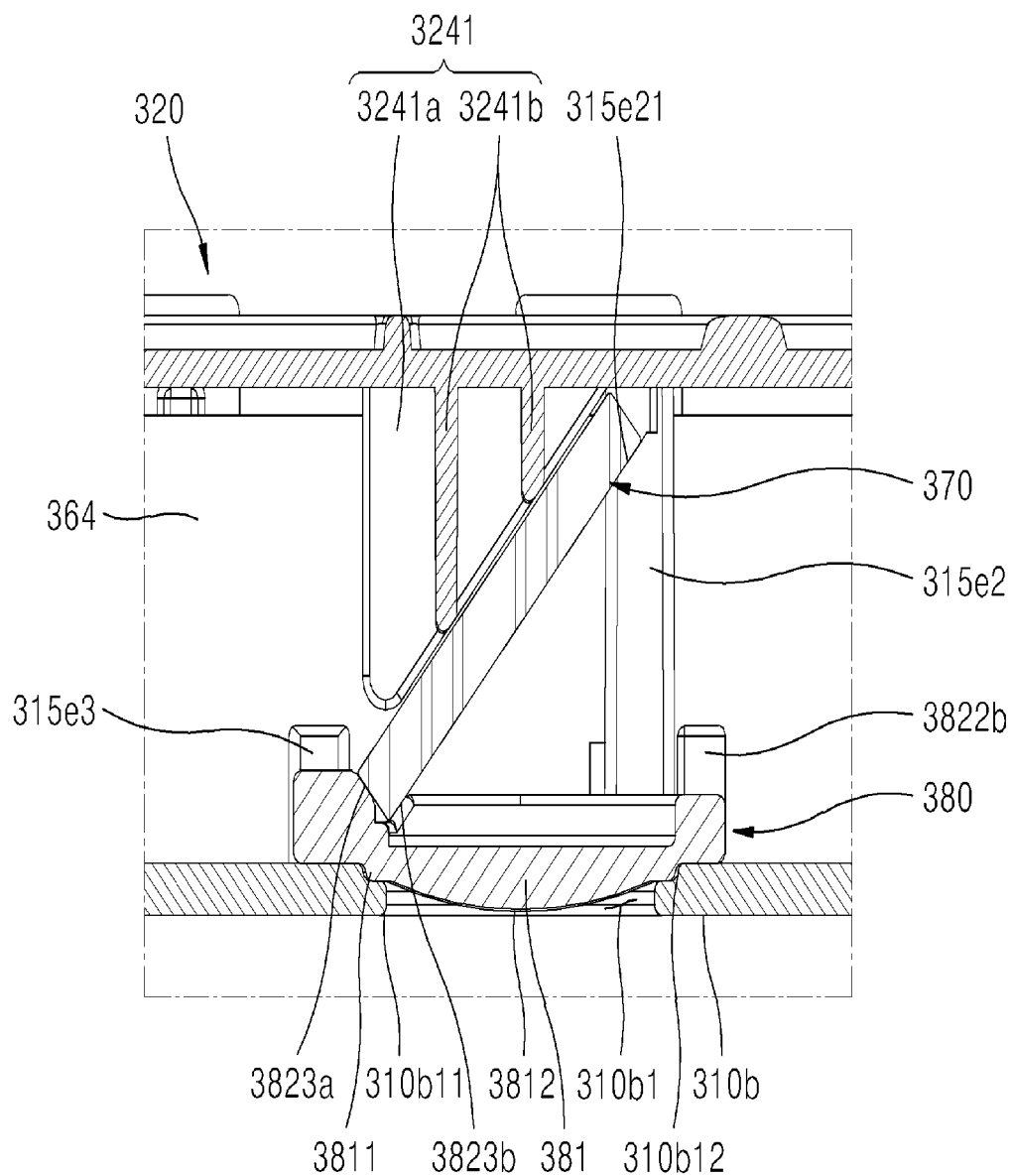
FIG. 25 is a sectional view cut-away from FIG. 24 along a left-right direction to describe a state where a cover is completely coupled to the state shown in FIG. 24.

As shown in FIG. 25, based on the arrangement state inside the holder 310, the refracting portion 381 of the second lens 380 may be recessed from the upper surface of the expanding portion 382 and protruded downward from the lower surface of the refracting portion 382 to be convex.

At this time, the refracting portion 381 formed convex downward may include a first portion 3811 of which the protruding thickness from the lower surface of the expanding portion 382 is maintained approximately uniform, and a second portion 3812 of which the protruding thickness changes.

The first portion 3811 may form a radial outer edge of the refracting portion 381, and may have the protruding height from the lower surface of the expanding portion 382 that is maintained approximately uniform or the change rate of the protruding height that is maintained much smaller than that of the second portion 3812.

For example, the first portion 3811 may have a ring shape of which the radial width is maintained approximately uniform.

The second portion 3812 may be disposed in a radial inner area with respect to the first portion 3811, and may have the vertical thickness that gradually increases as progressing toward the radial inner area.

Through such the shape of the first portion 3811, a predetermined step may be formed between the lower surface of the holder 310 and the first portion 3811 of the refracting portion 381.

Meanwhile, the second light transmission hole 310b1 may include a large diameter portion 310b12 having a relatively larger through-diameter; and a small diameter portion 310b11 having a relatively smaller through-diameter.

Based on the illustrated state, the large diameter portion 310b12 may form an upper portion of the second light transmission hole 310b1 and the small diameter portion 310b11 may form a lower portion of the second light transmission hole 310b1.

Through this, a step may be formed between the large diameter portion 310b12 and the small diameter portion 310b11, and the shape of the step formed in the second light transmission hole 310b1 may correspond to the shape of the step provided in the refracting portion 381 of the second lens 380.

Accordingly, the arrangement position of the refracting portion 381 of the second lens 380 may be accurately guided by the step formed between the large diameter portion 310b12 and the small diameter portion 310b11, so that the refracting portion 381 of the second lens 380 may be disposed in the holder 310 to be approximately concentric with the first light transmission hole 310b1.

In addition, since an inner circumferential surface of the large diameter portion 310b12 extends along the vertical direction and an outer circumferential surface of the first portion extends along the vertical direction, the inner circumferential surface of the large diameter portion 310b12 and the outer circumferential surface of the first portion 3811 may be maintained in contact with each other in at least predetermined area. The contact between the inner circumferential surface of the large diameter portion 310b12 and the outer circumferential surface of the first portion 3811, the horizontal relative movement of the second leans 380 with respect to the lower surface 310b of the holder 310 may be effectively restricted.

Meanwhile, the upper end of the reflector 370 is simply put on the first stopper rib 315e1 and the second stopper rib 315e2, and the lower end there is simply put in the locking groove 3823 of the second lens 380.

Since it is relatively movable upward in the illustrated state, the reflector 370 could be easily decoupled.

Means for preventing the upward separation and movement of the reflector 270 may be provided in the above-noted cover 320 as a support rib 3241.

Figure 26:
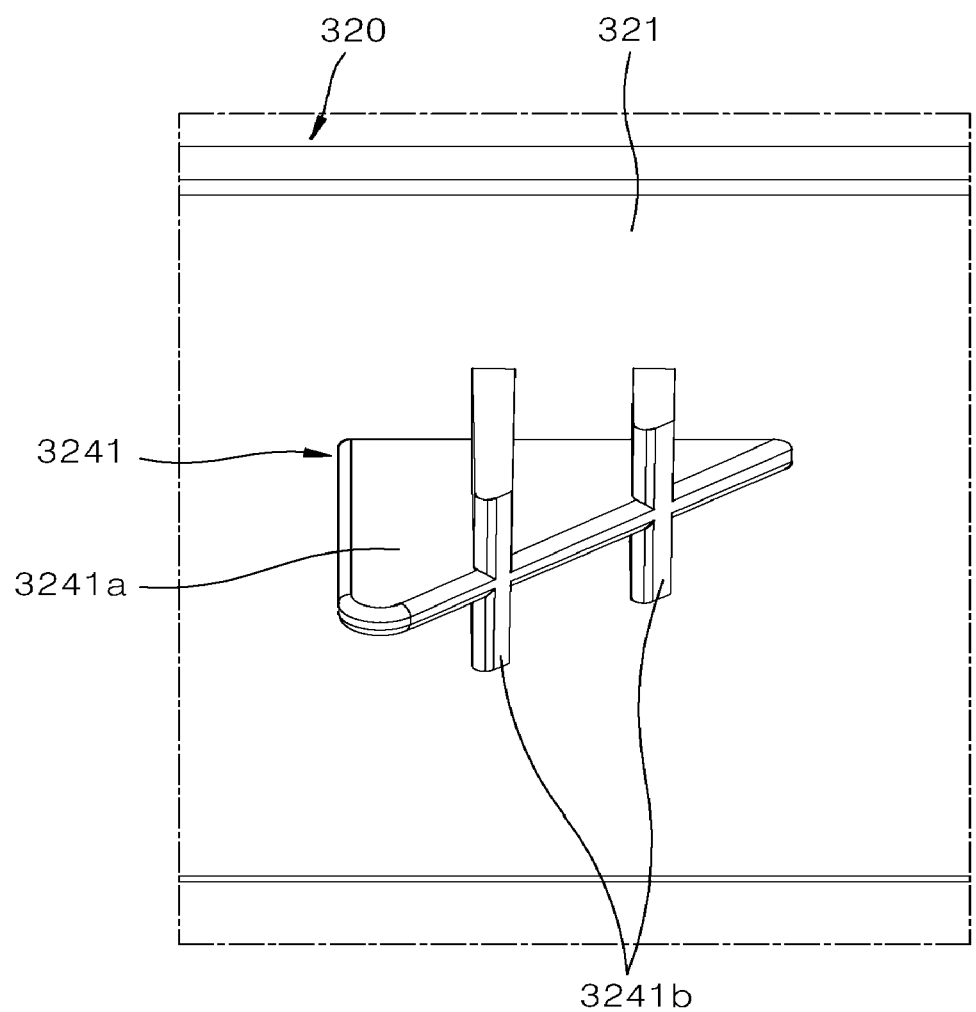
FIG. 26 is a bottom perspective view of a cover to describe a support rib provided in the cover.

As shown in FIGS. 25 and 26, the support rib 3241 may be integrally formed with the lower surface of the cover body 321.

More specifically, the support rib 3241 may include a first support rub 3241a having an upper end integrally connected with the lower surface of the cover body 321 and a lower end protruding toward the reflector 370.

As shown in FIG. 26, the first support rib 3241a may be provided as a barrier with a uniform thickness in the front-rear direction.

At this time, a lower end of the first support rib 3241a may have a shape having the vertical height that changes as progressing along the left-right direction to have an inclination gradient corresponding to the inclination angle of the reflector 370.

Meanwhile, the support rib 3241 may further include a second support rib 3241b having an upper end integrally formed with the lower surface of the cover body 321 and a lower end extending toward the reflector 370.

As shown in FIG. 26, the second support rib 3241*b* may be provided in a barrier shape with a left-right direction thickness that is uniform, and may be disposed to cross the first support rib 3241*a*.

FIG. 26 shows an embodiment that a pair of second support ribs 3241*b* are provided as one example. However, the present disclosure is not limited thereto but may be described based on the illustrated embodiment.

Corresponding to the installation state of the reflector 370, the vertical direction position of the lower end of the second support rib 3241*b* may be maintained to be uniform along the front-rear direction.

However, when the pair of the second support ribs 3241*b* are disposed at positions spaced apart from each other along the left-right direction, the positions of the lower ends of the pair of the second support ribs 3241*b* may be formed differently in response to the inclination angle of the reflector 370.

Through this, the lower end of the first support rib 3241*a* and the lower ends of the pair of the second support ribs 3241*b* may be located on the same virtual plane, and the virtual same plane may be in an approximately parallel relationship with the reflector 370.

Accordingly, when the coupling between the cover 320 and the holder 310 is completed, the lower end of the first support rib 3241*a* and the lower ends of the pair of the second support ribs 3241*b* may be disposed parallel to each other may contact the upper surface of the reflector 370 simultaneously or spaced a preset distance apart from the upper surface of the reflector 370.

Through this, the upward relative movement of the reflector may be effectively prevented without adding a separate support member, and the structure in which the reflector 370 can be stably supported may be achieved.

Electrical Connection Between Indicator and Controller

The indicator 300 of the dishwasher 1 according to an embodiment of the present disclosure maw be configured to operate based on an electrical control signal transmitted through the control unit 100.

Figure 27:
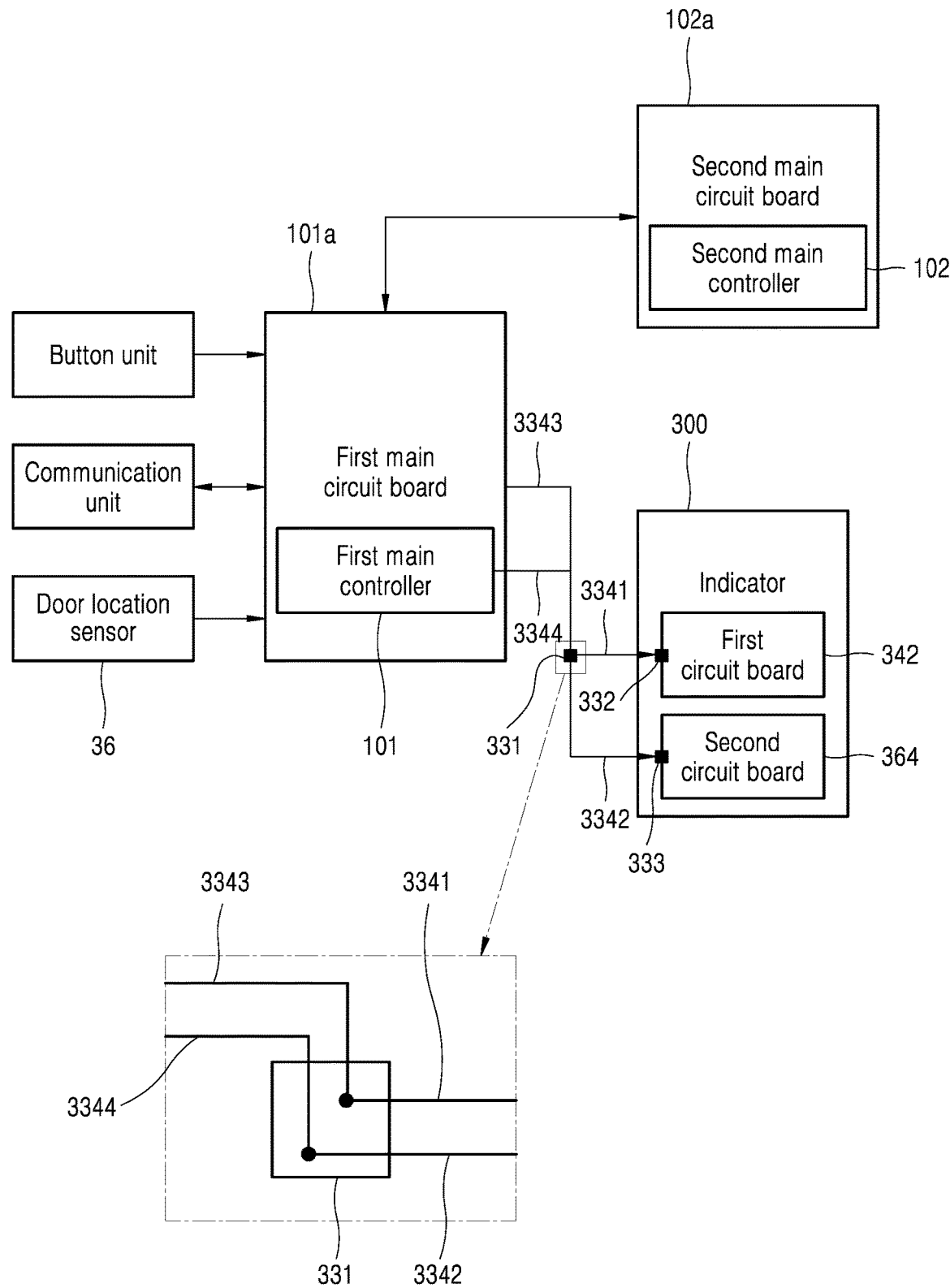
FIG. 27 is a function block view schematically showing an electrical connection relationship of an indicator with a first main controller and a second maintain controller, which constitute a controller of a dishwasher according to an embodiment.

More specifically, as shown in FIG. 27, the indicator 300 may be electrically connected to a first main controller 101 disposed inside the door 30, and operated based on an electrical control signal transmitted thereto.

As shown in the drawing, the first main controller 101 may be mounted on a first main circuit board 101*a*, and the first main circuit board 101*a* may be electrically connected to a second main circuit bard 102*a* provided in a control box through a separate cable. The above-noted second main controller 102 may be mounted on the second main circuit board 102*a*.

In addition, the first main circuit board 101*a* may be electrically connected to a button unit provided in the above-noted control panel to control an overall course process of the dishwasher 1, a communication unit communicably provided in an external network, and a door location sensor unit 36.

However, the first circuit board 342 and the second circuit board 364, which are provided in the indicator 300, may be disposed in the holder 310, with being separated from each other.

In addition, the first circuit board 342 and the second circuit board 364 may be configured to separately receive control signals for operating the light source element 341 and the LCD panel 361, respectively, from the first main controller 101.

In this way, while the firsts circuit board 342 and the second circuit board 364 may separately receive a control signal from the first main controller 101, the dishwasher 1 according to an embodiment of the present disclosure may further include a harness module 330 configured to electrically and collectively connect the first circuit board 342 and the second circuit board 364 to the first main circuit board 101*a*.

More specifically, as shown in FIGS. 9 and 27, the harness module 330 may include a first cable having one end connected to the first circuit board 342; a second cable 3342 having one end connected to the second circuit board; a third cable having one end connected to the first main circuit board; a fourth cable 3344 having one end connected to the first main circuit board 101*a*; and a main connector 331 holding the other end of the first cable 3341 and the other end of the second cable 3342 collectively.

At this time, the main connector 331 may be separately and collectively connect between the other end of the first cable 3341 and the other end of the third cable 3343, and between the other end of the second cable 3342 and the other end of the fourth cable 3344.

Accordingly, the other end of the first cable 3341 and the other end of the second cable 3342 branched to be connected to the first circuit board 342 and the second circuit board 364 through the first terminal 332 and the second terminal 333 may be integrally managed and maintained by the main connector 331.

Through this, the first cable 3341 and the second cable 3342 may be effectively disposed in the somewhat narrow, space SA between tub 20 and the lower frame 200, thereby improving space utilization.

Visual Image Displayed by Indicator

Hereinafter, referring to FIGS. 28 and 29, an example of the visual image information displayed by the indicator 300 of the dishwasher 1 according to an embodiment of the present disclosure will be described.

Figure 28:
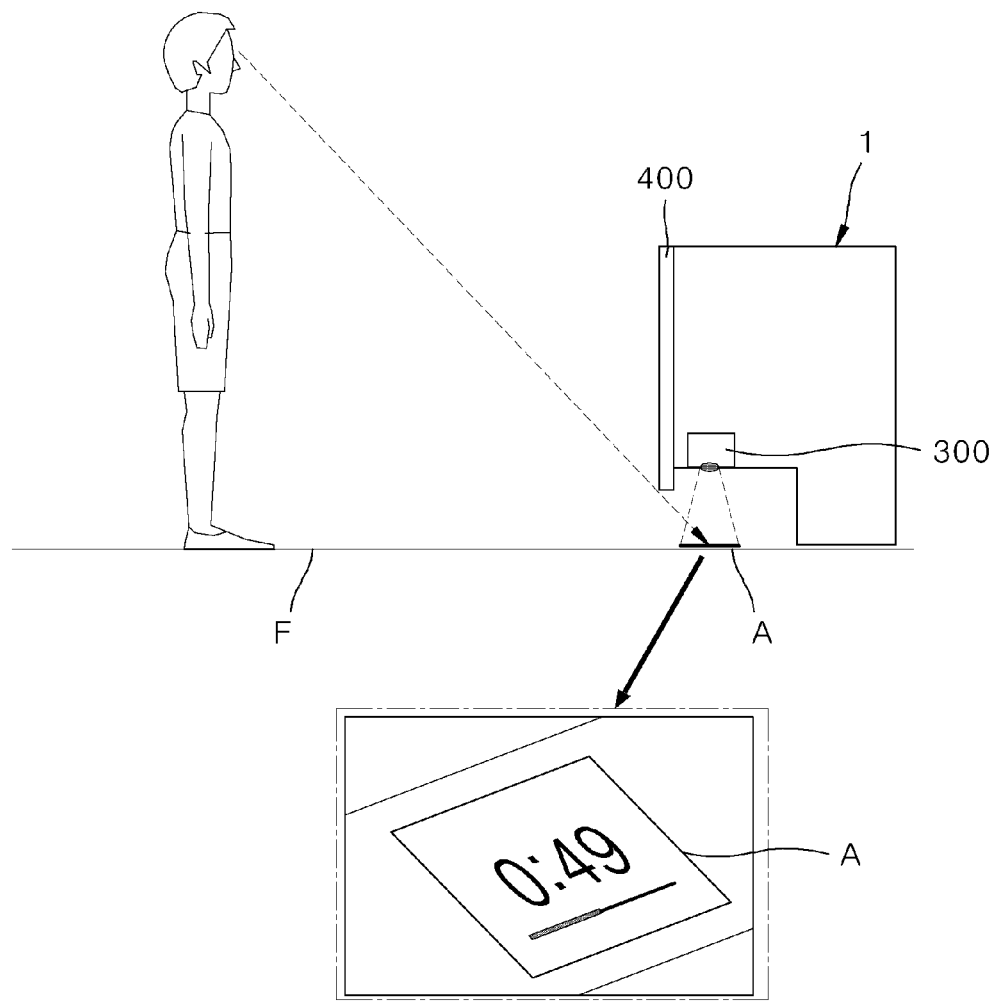
FIG. 28 show a schematic view and a partially enlarged view to describe a state where information displayed through an indicator of a dishwasher is recognized by a user.

As shown in FIG. 28, the indicator 300 may perform the function of displaying predetermined information about the operating state of the dishwasher 1 into a visual image by projecting a visible light beam to the external bottom floor F supporting the dishwasher 1.

The user can intuitively check the current operating state of the dishwasher through the visual image projected on the external bottom floor F.

The visual image may be image information that may be intuitively recognized by the user inside the display area (A) where the visible light beam is projected.

Figure 29:
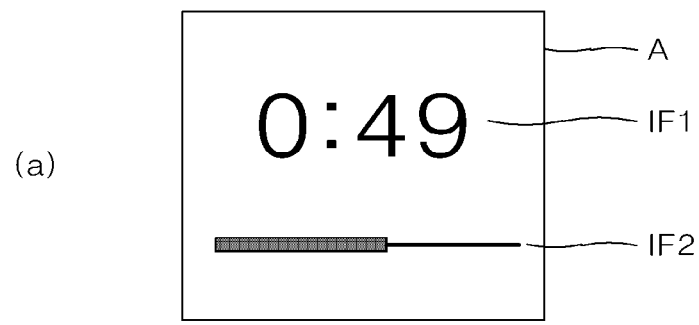
FIG. 29 is a view showing examples of images visually displayed on an external floor surface through the indicator of FIG. 28.
Figure 29:
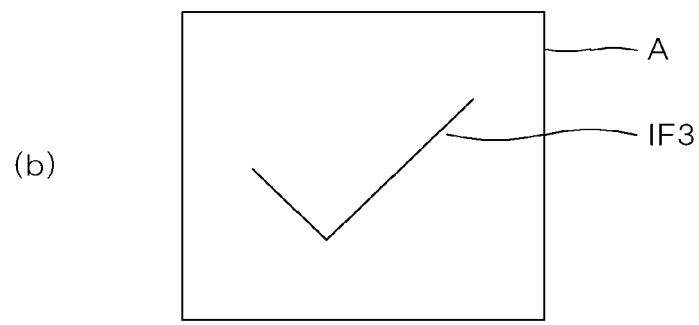
Figure 29:
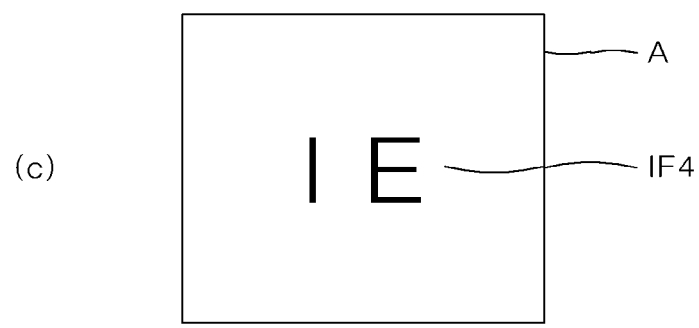

As shown in FIG. 29, for example, the visual image may include a numeric image IF1 which displays information about the remaining time of an ongoing course; a bar image IF2 which displays the progress of an ongoing course; a completion image IF3 which displays information that a unit or entire course is completed; and an error IF4 which displays information that an ongoing course has been stopped due to a certain error.

The numeric image IF1 and the bar image TR2 may be displayed collectively or separately.

An image indicating types of errors may be added to the error image IF4.

Such images may be only examples. As described above, the dishwasher 1 according to an embodiment may include the communication unit that is communicatively connected to an external network. Accordingly, the dishwasher 1 may additionally download new images different from existing images from an external server through the communication unit and store them.

Therefore, it will be possible to allow the user to select and combine desired images among the existing and newly saved images according to the user convenience.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

What is claimed is:

1. A dishwasher comprising an indicator configured to display a visual image by projecting a light beam to an external floor, the indicator including:
    a holder including an accommodating space;
    a light source module positioned in the accommodating space, the light source module being configured to generate the light beam;
    a first lens configured to refract the light beam generated in the light source module;
    a liquid crystal display (LCD) module configured to generate the visual image by partially blocking the light beam having passed through the first lens;
    a reflector configured to change a traveling path of the light beam having passed through the LCD module toward the external floor; and
    a second lens configured to refract the light beam of which the traveling path is changed,
    wherein a stopper rib is provided on an inner surface of the holder,
    wherein the reflector is supported by the stopper rib,
    wherein a first side of the reflector is supported by the stopper rib, and
    wherein a second side of the reflector is supported by second lens.

2. The dishwasher of claim 1, wherein the stopper rib extends along a vertical direction, and
    wherein an upper portion of the reflector is supported by the stopper rib.

3. The dishwasher of claim 1, wherein a groove formed concave downward is provided on a surface of the second lens, and
    wherein the second side of the reflector is supported by the groove.

4. The dishwasher of claim 1, wherein the reflector is supported by the stopper rib in a state of being inclined with respect to the second lens, and
    wherein an inclined surface having an inclination angle corresponding to an inclination gradient of the reflector is provided at the stopper rib, and the reflector is in contact with the inclined surface.

5. The dishwasher of claim 1, wherein the stopper rib is integrally connected to a lower surface of the holder.

6. A dishwasher comprising an indicator configured to display a visual image by projecting a light beam to an external floor, the indicator including:
    a holder in which an accommodating space is formed;
    a light source module accommodated in the accommodating space and configured to generate the light beam; and
    a lens configured to refract the light beam generated in the light source module,
    wherein the light beam refracted while passing through the lens is projected toward the external floor after passing through a light transmission hole formed in the holder,
    wherein the lens includes:
        a refracting portion having a convex lens shape; and
        an expanding portion forming an outer circumferential surface of the retracting portion, and
    wherein a protrusion protruding upward is integrally formed on an upper surface of the expanding portion.

7. The dishwasher of claim 6, wherein the refracting portion is convex toward the external floor.

8. The dishwasher of claim 6, wherein the refracting portion is disposed on the holder to be at least partially inserted in the light transmission hole.

9. The dishwasher of claim 6, wherein the refracting portion is disposed on the holder so as not to protrude beyond the light transmission hole.

10. A dishwasher comprising an indicator configured to display a visual image by projecting a light beam to an external floor, the indicator including:
    a holder in which an accommodating space is formed;
    a light source module accommodated in the accommodating space and configured to generate the light beam;
    a lens configured to refract the light beam generated in the light source module; and
    a reflector configured to change a traveling path of the light beam toward the external floor,
    wherein the light beam refracted while passing through the lens is projected toward the external floor after passing through a light transmission hole formed in the holder,
    wherein at least one of a protrusion, a groove and a notch slot is provided on the lens to be coupled to the holder,
    wherein a stopper rib preventing a movement of the reflector is provided on a lower surface of a cover, and
    wherein a first side of the reflector is supported by the stopper rib, and
    wherein a second side of the reflector is supported by the at least one of the protrusion, the groove and the notch slot.

11. The dishwasher of claim 10, wherein the at least one of the protrusion, the locking groove and the notch slot is in contact with the holder.

12. The dishwasher of claim 1, wherein the first lens has a length extending in a first direction, and
    wherein the second lens has a length extending in a second direction, the second direction being different than the first direction.

13. The dishwasher of claim 12, wherein the first direction is a vertical direction, and
    wherein the second direction is a horizontal direction.

14. The dishwasher of claim 13, wherein the reflector has a length extending in a third direction different than the first direction and the second direction.

15. The dishwasher of claim 1, wherein the second lens includes a plurality of protrusions located on an upper side of the second lens.

16. The dishwasher of claim 1, wherein each corner of an uppers side of the second lens includes a protrusion.

17. The dishwasher of claim 1, wherein the second lens includes a plurality of notches located on side surfaces of the second lens, the plurality of notches being configured to receive portions of the stopper rib.

* * * * *